United States Patent
Basur Shankarappa et al.

(10) Patent No.: US 12,530,214 B2
(45) Date of Patent: Jan. 20, 2026

(54) RUNTIME CUSTOMIZATION OF NODES FOR NETWORK FUNCTION DEPLOYMENT

(71) Applicant: VMware LLC, Palo Alto, CA (US)

(72) Inventors: Narendra Kumar Basur Shankarappa, Sunnyvale, CA (US); Serge Maskalik, Los Gatos, CA (US); Sachin Thakkar, San Jose, CA (US); Uday Suresh Masurekar, Sunnyvale, CA (US); Leon Cui, Beijing (CN); Kiran Kumar Cherivirala, Bangalore (IN); Sachin M. Bendigeri, Bangalore (IN); Hemanth Kumar Pannem, Danville, CA (US); Akshatha Sathyanarayan, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 919 days.

(21) Appl. No.: 17/671,347

(22) Filed: Feb. 14, 2022

(65) Prior Publication Data
US 2023/0094120 A1    Mar. 30, 2023

(30) Foreign Application Priority Data

Sep. 27, 2021  (IN) .............................. 202141043732
Jan. 7, 2022   (WO) ................ PCT/CN2022/070708

(51) Int. Cl.
*G06F 9/455*        (2018.01)
*G06F 9/50*         (2006.01)

(52) U.S. Cl.
CPC ........ *G06F 9/45558* (2013.01); *G06F 9/5077* (2013.01); *G06F 2009/45562* (2013.01);
(Continued)

(58) Field of Classification Search
None
See application file for complete search history.

(56) References Cited

U.S. PATENT DOCUMENTS 6,504,818 B1    1/2003   Levine
7,417,947 B1    8/2008   Marques et al.
(Continued)

FOREIGN PATENT DOCUMENTS

CN    104584491 A    4/2015
CN    107566440 A    1/2018
(Continued)

OTHER PUBLICATIONS

J. R. Gunasekaran, et al., "Multiverse: Dynamic VM Provisioning for Virtualized High Performance Computing Clusters," 2020 20th IEEE/ACM International Symposium on Cluster, Cloud and Internet Computing (CCGRID), Melbourne, VIC, Australia, 2020, pp. 131-141. (Year: 2020).*
(Continued)

*Primary Examiner* — Frank D Mills
(74) *Attorney, Agent, or Firm* — Quarles & Brady LLP

(57) ABSTRACT

Some embodiments provide a method that generates (i) a node profile of a worker node in a workload cluster for deploying a first network function and (ii) a host profile of a virtual machine that implements the workload cluster and a management cluster that manages the workload cluster. The method updates a configuration map of the worker node based on the node profile. The method uses a node configuration operator in a remote data center to configure the worker node based on the configuration map. The method uses a virtual machine configuration operator in the remote data center to configure one or more nodes of the management cluster based on the host profile.

23 Claims, 15 Drawing Sheets

(52) U.S. Cl.
CPC ........... *G06F 2009/4557* (2013.01); *G06F 2009/45595* (2013.01); *G06F 2209/505* (2013.01)

(56) References Cited

U.S. PATENT DOCUMENTS

| | | | |
|---|---|---|---|
| 9,124,538 | B2 | 9/2015 | Koponen et al. |
| 9,438,491 | B1 | 9/2016 | Kwok et al. |
| 10,111,163 | B2 | 10/2018 | Vrzic et al. |
| 10,243,835 | B2 | 3/2019 | Wang et al. |
| 10,447,597 | B1 | 10/2019 | Kim et al. |
| 10,461,421 | B1 | 10/2019 | Tran et al. |
| 10,555,134 | B2 | 2/2020 | Shaw et al. |
| 10,609,530 | B1 | 3/2020 | Patil et al. |
| 10,708,143 | B2 | 7/2020 | Zhang et al. |
| 10,708,189 | B1 | 7/2020 | Agrawal et al. |
| 10,735,331 | B1 | 8/2020 | Li et al. |
| 10,834,669 | B2 | 11/2020 | Bordeleau et al. |
| 10,841,152 | B1 * | 11/2020 | Humphreys ............ H04L 67/10 |
| 10,856,217 | B1 | 12/2020 | Young et al. |
| 10,939,369 | B2 | 3/2021 | Bordeleau et al. |
| 11,009,372 | B2 | 5/2021 | Klimenko |
| 11,012,288 | B2 | 5/2021 | Kommula et al. |
| 11,024,144 | B2 | 6/2021 | Bordeleau et al. |
| 11,108,643 | B2 | 8/2021 | Kommula et al. |
| 11,146,964 | B2 | 10/2021 | Bordeleau et al. |
| 11,178,016 | B2 | 11/2021 | Kommula et al. |
| 11,240,113 | B2 | 2/2022 | Kommula et al. |
| 11,246,087 | B2 | 2/2022 | Bordeleau et al. |
| 11,372,663 | B2 * | 6/2022 | Featonby ............ G06F 9/5077 |
| 11,483,762 | B2 | 10/2022 | Bordeleau et al. |
| 11,522,764 | B2 | 12/2022 | Kommula et al. |
| 11,540,287 | B2 | 12/2022 | Singh et al. |
| 2003/0026205 | A1 | 2/2003 | Mullendore et al. |
| 2005/0278501 | A1 | 12/2005 | Taguchi |
| 2006/0146712 | A1 | 7/2006 | Conner et al. |
| 2010/0322255 | A1 | 12/2010 | Hao et al. |
| 2011/0202634 | A1 | 8/2011 | Kovvali et al. |
| 2013/0125230 | A1 | 5/2013 | Koponen et al. |
| 2013/0279504 | A1 | 10/2013 | Gulati et al. |
| 2013/0282867 | A1 | 10/2013 | Otake |
| 2014/0064283 | A1 | 3/2014 | Balus et al. |
| 2014/0233385 | A1 | 8/2014 | Beliveau et al. |
| 2014/0307744 | A1 | 10/2014 | Dunbar et al. |
| 2014/0342712 | A1 | 11/2014 | Madhavan et al. |
| 2015/0074264 | A1 | 3/2015 | Izhak-Ratzin et al. |
| 2015/0117454 | A1 | 4/2015 | Koponen et al. |
| 2015/0163117 | A1 | 6/2015 | Lambeth et al. |
| 2015/0264119 | A1 * | 9/2015 | Shau ..................... H04L 67/10 709/203 |
| 2015/0358654 | A1 | 12/2015 | Zhang et al. |
| 2015/0381486 | A1 | 12/2015 | Xiao et al. |
| 2015/0381493 | A1 | 12/2015 | Bansal et al. |
| 2016/0335107 | A1 | 11/2016 | Behera et al. |
| 2016/0344565 | A1 | 11/2016 | Batz et al. |
| 2016/0353465 | A1 | 12/2016 | Vrzic et al. |
| 2016/0360408 | A1 | 12/2016 | Senarath et al. |
| 2017/0054595 | A1 | 2/2017 | Zhang et al. |
| 2017/0085628 | A1 | 3/2017 | Mahindra et al. |
| 2017/0093633 | A1 | 3/2017 | Chang et al. |
| 2017/0111187 | A1 | 4/2017 | Zanier et al. |
| 2017/0142591 | A1 | 5/2017 | Vrzic |
| 2017/0250893 | A1 | 8/2017 | Duda |
| 2017/0250906 | A1 | 8/2017 | MeLampy et al. |
| 2017/0264483 | A1 | 9/2017 | Lambeth et al. |
| 2017/0289791 | A1 | 10/2017 | Yoo et al. |
| 2017/0330245 | A1 | 11/2017 | Guermas et al. |
| 2017/0332212 | A1 | 11/2017 | Gage |
| 2017/0332421 | A1 | 11/2017 | Sternberg et al. |
| 2018/0006935 | A1 | 1/2018 | Mutnuru et al. |
| 2018/0027043 | A1 | 1/2018 | Doorn et al. |
| 2018/0088972 | A1 | 3/2018 | Kubota et al. |
| 2018/0183866 | A1 | 6/2018 | Gunda et al. |
| 2018/0191607 | A1 | 7/2018 | Kanakarajan |
| 2018/0219762 | A1 | 8/2018 | Wang et al. |
| 2018/0220276 | A1 | 8/2018 | Senarath et al. |
| 2018/0220277 | A1 | 8/2018 | Senarath et al. |
| 2018/0248770 | A1 | 8/2018 | Regmi et al. |
| 2018/0270713 | A1 | 9/2018 | Park et al. |
| 2018/0270743 | A1 | 9/2018 | Callard et al. |
| 2018/0295036 | A1 | 10/2018 | Krishnamurthy et al. |
| 2018/0332441 | A1 | 11/2018 | Shaw et al. |
| 2018/0368060 | A1 | 12/2018 | Kedalagudde et al. |
| 2019/0044755 | A1 | 2/2019 | Takajo et al. |
| 2019/0053104 | A1 | 2/2019 | Qiao et al. |
| 2019/0058508 | A1 | 2/2019 | Yiu |
| 2019/0075082 | A1 | 3/2019 | Adam et al. |
| 2019/0104458 | A1 | 4/2019 | Svennebring et al. |
| 2019/0123963 | A1 | 4/2019 | Tang et al. |
| 2019/0124704 | A1 | 4/2019 | Sun et al. |
| 2019/0150080 | A1 | 5/2019 | Davies et al. |
| 2019/0158364 | A1 | 5/2019 | Zhang et al. |
| 2019/0159117 | A1 | 5/2019 | Kuge et al. |
| 2019/0174573 | A1 | 6/2019 | Velev et al. |
| 2019/0187999 | A1 | 6/2019 | Lu et al. |
| 2019/0191309 | A1 | 6/2019 | Kweon et al. |
| 2019/0191480 | A1 | 6/2019 | Dowlatkhah et al. |
| 2019/0200286 | A1 | 6/2019 | Usui et al. |
| 2019/0268633 | A1 | 8/2019 | Jayawardene et al. |
| 2019/0268973 | A1 | 8/2019 | Bull et al. |
| 2019/0280976 | A1 | 9/2019 | Wang |
| 2019/0287146 | A1 | 9/2019 | Maitland et al. |
| 2019/0289470 | A1 | 9/2019 | Vaidya et al. |
| 2019/0320494 | A1 | 10/2019 | Jayawardene et al. |
| 2019/0364475 | A1 | 11/2019 | Chandramouli |
| 2019/0370376 | A1 | 12/2019 | Demmon et al. |
| 2019/0373520 | A1 | 12/2019 | Sillanpää |
| 2020/0007445 | A1 | 1/2020 | Anwer et al. |
| 2020/0053531 | A1 | 2/2020 | Myhre et al. |
| 2020/0053545 | A1 | 2/2020 | Wong et al. |
| 2020/0067831 | A1 | 2/2020 | Spraggins et al. |
| 2020/0077327 | A1 | 3/2020 | Duan et al. |
| 2020/0106536 | A1 | 4/2020 | Bedekar |
| 2020/0120721 | A1 | 4/2020 | Lau et al. |
| 2020/0120724 | A1 | 4/2020 | Vaidya et al. |
| 2020/0134620 | A1 | 4/2020 | Aiello et al. |
| 2020/0137621 | A1 | 4/2020 | Yang et al. |
| 2020/0213360 | A1 | 7/2020 | Ojha et al. |
| 2020/0235990 | A1 | 7/2020 | Janakiraman et al. |
| 2020/0252142 | A1 | 8/2020 | Bedekar |
| 2020/0273314 | A1 | 8/2020 | Bordeleau et al. |
| 2020/0275281 | A1 | 8/2020 | Bordeleau et al. |
| 2020/0275357 | A1 | 8/2020 | Bordeleau et al. |
| 2020/0275358 | A1 | 8/2020 | Bordeleau et al. |
| 2020/0275359 | A1 | 8/2020 | Bordeleau et al. |
| 2020/0275360 | A1 | 8/2020 | Bordeleau et al. |
| 2020/0280615 | A1 | 9/2020 | Andersson et al. |
| 2020/0314029 | A1 | 10/2020 | Gopinath et al. |
| 2020/0348918 | A1 * | 11/2020 | Giannetti ............ H04L 61/3025 |
| 2021/0014912 | A1 | 1/2021 | Song et al. |
| 2021/0037390 | A1 | 2/2021 | Tofighbakhsh et al. |
| 2021/0051490 | A1 | 2/2021 | Yanover et al. |
| 2021/0064407 | A1 | 3/2021 | Kommula et al. |
| 2021/0064451 | A1 | 3/2021 | Kommula et al. |
| 2021/0067416 | A1 | 3/2021 | Kommula et al. |
| 2021/0067439 | A1 | 3/2021 | Kommula et al. |
| 2021/0117217 | A1 * | 4/2021 | Croteau ............ G06F 11/3409 |
| 2021/0200814 | A1 * | 7/2021 | Tal .................... G06F 16/90335 |
| 2021/0224145 | A1 | 7/2021 | Warmack |
| 2021/0234803 | A1 | 7/2021 | Parekh et al. |
| 2021/0263751 | A1 * | 8/2021 | Wiest ................. G06F 11/3006 |
| 2021/0297419 | A1 | 9/2021 | Xu et al. |
| 2022/0038902 | A1 | 2/2022 | Mueck |
| 2022/0167236 | A1 | 5/2022 | Melodia et al. |
| 2022/0210706 | A1 | 6/2022 | Parekh et al. |
| 2022/0210708 | A1 | 6/2022 | Parekh et al. |
| 2022/0225264 | A1 | 7/2022 | Song et al. |
| 2022/0237049 | A1 | 7/2022 | Wiggers et al. |
| 2022/0279535 | A1 | 9/2022 | Tsui |
| 2022/0283832 | A1 | 9/2022 | Singh et al. |
| 2022/0283839 | A1 | 9/2022 | Srinivasan et al. |
| 2022/0283840 | A1 | 9/2022 | Jayavelu et al. |
| 2022/0283841 | A1 | 9/2022 | Jayavelu et al. |
| 2022/0283842 | A1 | 9/2022 | Singh et al. |

(56) References Cited

U.S. PATENT DOCUMENTS

| | | | |
|---|---|---|---|
| 2022/0283843 | A1 | 9/2022 | Singh |
| 2022/0283882 | A1 | 9/2022 | Singh et al. |
| 2022/0286536 | A1 | 9/2022 | Singh et al. |
| 2022/0286837 | A1 | 9/2022 | Yang et al. |
| 2022/0286840 | A1 | 9/2022 | Singh |
| 2022/0286914 | A1 | 9/2022 | Gudipati et al. |
| 2022/0286915 | A1 | 9/2022 | Gudipati et al. |
| 2022/0286916 | A1 | 9/2022 | Yang et al. |
| 2022/0286939 | A1 | 9/2022 | Gudipati et al. |
| 2022/0287038 | A1 | 9/2022 | Singh et al. |
| 2022/0342732 | A1 | 10/2022 | Subramani Jayavelu et al. |
| 2022/0398119 | A1* | 12/2022 | Kim .................. G06F 9/45558 |
| 2023/0041056 | A1 | 2/2023 | Bordeleau et al. |
| 2023/0069604 | A1 | 3/2023 | Subramani et al. |
| 2023/0100276 | A1 | 3/2023 | Basur Shankarappa et al. |
| 2023/0123237 | A1 | 4/2023 | Kommula et al. |

FOREIGN PATENT DOCUMENTS

| | | |
|---|---|---|
| CN | 108259216 A | 7/2018 |
| CN | 108781178 A | 11/2018 |
| CN | 111512650 A | 8/2020 |
| CN | 114449459 A | 5/2022 |
| EP | 2648370 A1 | 10/2013 |
| JP | 2014158289 A | 8/2014 |
| JP | 2017516424 A | 6/2017 |
| JP | 2018518927 A | 7/2018 |
| JP | 2018125837 A | 8/2018 |
| JP | 2021507636 A | 2/2021 |
| WO | 2016159192 A1 | 10/2016 |
| WO | 2016206742 A1 | 12/2016 |
| WO | 2017150642 A1 | 9/2017 |
| WO | 2018072824 A1 | 4/2018 |
| WO | 2019120694 A1 | 6/2019 |
| WO | 2019129374 A1 | 7/2019 |
| WO | 2019147316 A1 | 8/2019 |
| WO | 2019229492 A1 | 12/2019 |
| WO | 2020171957 A1 | 8/2020 |
| WO | 2020242987 A1 | 12/2020 |
| WO | 2021040935 A1 | 3/2021 |
| WO | 2022011862 A1 | 1/2022 |
| WO | 2022156887 A1 | 7/2022 |
| WO | 2022177333 A1 | 8/2022 |
| WO | 2022186883 A1 | 9/2022 |
| WO | 2022186912 A1 | 9/2022 |
| WO | 2022194359 A1 | 9/2022 |

OTHER PUBLICATIONS

Balasubramanian, Bharath, et al., "RIC: A RAN Intelligent Controller Platform for AI-Enabled Cellular Networks," Apr. 16, 2021, 11 pages, IEEE.

Schmidt, Robert, "RAN Engine: Service-Oriented RAN Through Containerized Micro-Services," IEEE Transactions on Network and Service Management, Mar. 2021, 14 pages, vol. 18, No. 1, IEEE.

Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.

Bonati, Leonardo, et al., "Open, Programmable, and Virtualized 5G Networks: State-of-the-Art and the Road Ahead," Aug. 25, 2020, 32 pages, retrieved from https://arxiv.org/abs/2005.10027v3.

Czichy, Thoralf, 5G RAN Optimization Using the O-RAN Software Community's RIC (RAN Intelligent Controller), Open Networking Summit Europe, Sep. 23, 2019, 23 pages, The Linux Foundation, Antwerp, Belgium.

Non-Published Commonly Owned U.S. Appl. No. 17/376,758, filed Jul. 15, 2021, 50 pages, VMware, Inc.

Non-Published Commonly Owned U.S. Appl. No. 17/376,766, filed Jul. 15, 2021, 50 pages, VMware, Inc.

Non-Published Commonly Owned U.S. Appl. No. 17/376,785, filed Jul. 15, 2021, 50 pages, VMware, Inc.

Non-Published Commonly Owned U.S. Appl. No. 17/376,801, filed Jul. 15, 2021, 36 pages, VMware, Inc.

Non-Published Commonly Owned U.S. Appl. No. 17/376,817, filed Jul. 15, 2021, 36 pages, VMware, Inc.

Non-Published Commonly Owned U.S. Appl. No. 17/376,835, filed Jul. 15, 2021, 36 pages, VMware, Inc.

Non-Published Commonly Owned U.S. Appl. No. 17/384,475, filed Jul. 23, 2021, 55 pages, VMware, Inc.

Non-Published Commonly Owned U.S. Appl. No. 17/384,476, filed Jul. 23, 2021, 56 pages, VMware, Inc.

Non-Published Commonly Owned U.S. Appl. No. 17/384,777, filed Jul. 25, 2021, 87 pages, VMware, Inc.

Non-Published Commonly Owned U.S. Appl. No. 17/384,778, filed Jul. 25, 2021, 87 pages, VMware, Inc.

Non-Published Commonly Owned U.S. Appl. No. 17/384,779, filed Jul. 25, 2021, 87 pages, VMware, Inc.

Non-Published Commonly Owned U.S. Appl. No. 17/384,780, filed Jul. 25, 2021, 87 pages, VMware, Inc.

Non-Published Commonly Owned U.S. Appl. No. 17/384,781, filed Jul. 25, 2021, 87 pages, VMware, Inc.

Non-Published Commonly Owned U.S. Appl. No. 17/384,782, filed Jul. 25, 2021, 87 pages, VMware, Inc.

Non-Published Commonly Owned U.S. Appl. No. 17/384,784, filed Jul. 25, 2021, 87 pages, VMware, Inc.

Non-Published Commonly Owned Related U.S. Appl. No. 17/671,379 with similar specification, filed Feb. 14, 2022, 49 pages, VMware, Inc.

Author Unknown, "5G RIC—RAN Intelligent Controller," Jun. 26, 2020, 4 pages, retrieved from http://www.techplayon.com/5g-ric-ran-intelligent-controller/.

Author Unknown, "Open RAN 101—Role of RAN Intelligent Controller: Why, what, when, how?," Jul. 30, 2020, 8 pages.

Author Unknown, "O-Ran Operations and Maintenance Architecture," O-Ran WG1 OAM-Architecture-v04.00, Month Unknown 2021, 55 pages, O-RAN Alliance.

Non-Published Commonly Owned U.S. Appl. No. 17/976,788 (F435.03.C1), filed Oct. 29, 2022, 62 pages, VMware, Inc.

* cited by examiner

```
Definition of infra_requirements tosca.nodes.nfv.VNF:
    derived_from: tosca.nodes.Root
    description: The generic abstract type from which all VNF
specific abstract node types shall be derived to form, together
with other node types, the TOSCA service template(s)
representing the VNFD
    properties:
      descriptor_id:  instead of nfd_id
        type: string  GUID
        description: Globally unique identifier of the VNFD
        required: true
      provider:  instead of nf_provider
        type: string
        description: Provider of the VNF and of the VNFD
        required: true
      product_name:  instead of nf_product_name
        type: string
        description: Human readable name for the VNF Product
        required: true
      software_version:  instead of nf_software_version
        type: string
        description: Software version of the NF
        required: true
      vnfm_info:
        type: list
        required: true
        description: Identifies VNFM(s) compatible with the NF
        entry_schema:
          type: string
      infra_requirements:
        type: InfraRequirements
        required: false
        description: These are the infra requirements for the
Network Function
```

*FIG. 3*

```
tosca.datatypes.nfv.InfraRequirements:
    derived_from: tosca.datatypes.Root
    properties:
        node_components:
            type: tosca.datatypes.nfv.NodeComponents
            required: false
        caas_components:
            type: list
            required: false
            entry_schema:
                type: tosca.datatypes.nfv.CaasComponentsData tosca.datatypes.nfv.NodeComponents:
    derived_from: tosca.datatypes.Root
    properties:
        isNumaConfigNeeded:
            type: boolean
            required: false
        kernel:
            type: tosca.datatypes.nfv.Kernel
            required: false
        network:
            type: tosca.datatypes.nfv.Network
            required: false
        passthrough_devices:
            type: list
            required: false
            entity_schema: tosca.datatypes.nfv.PassthroughDevices
        latency_sensitivity:
            type: string
            required: false
        additional_config:
            type: list
            required: false
            entity_schema: tosca.datatypes.nfv.AdditionalConfig
        file_injection:
            type: list
            required: false
            entity_schema: tosca.datatypes.nfv.FileInjection
tosca.datatypes.nfv.Kernel:
    derived_from: tosca.datatypes.Root
    properties:
        kernel_type:
            type: tosca.datatypes.nfv.KernelType
            required: false
        kernel_args:
            type: list
            required: false
            entry_schema:
                type: tosca.datatypes.nfv.KernelArgsData
        kernel_modules:
            type: list
            required: false
            entry_schema:
                type: tosca.datatypes.nfv.KernelModulesData
        custom_packages:
            type: list
            required: false
            entry_schema:
                type: tosca.datatypes.nfv.CustomPackagesData tosca.datatypes.nfv.KernelType:
    derived_from: tosca.datatypes.Root
    properties:
        name:
            type: string
            required: true
        version:
            type: string
            required: true
        image:
            type: string
            required: false tosca.datatypes.nfv.KernelArgsData:
    derived_from: tosca.datatypes.Root
    properties:
        key:
            type: string
            required: true
        value:
            type: string
            required: false tosca.datatypes.nfv.KernelModulesData:
    derived_from: tosca.datatypes.Root
    properties:
        name:
            type: string
            required: true
        version:
            type: string
            required: true tosca.datatypes.nfv.CustomPackagesData:
    derived_from: tosca.datatypes.Root
    properties:
        name:
            type: string
            required: true
        version:
            type: string
            required: true tosca.datatypes.nfv.Network:
    derived_from: tosca.datatypes.Root
    properties:
        devices:
            type: list
            required: true
            entry_schema:
                type: tosca.datatypes.nfv.NetworkDevices
```

*FIG. 4*

RUNTIME CUSTOMIZATION OF NODES FOR NETWORK FUNCTION DEPLOYMENT

BACKGROUND

Telco cloud is a software-defined cloud infrastructure that allows telecommunications services providers (telcos) to add services more quickly, respond faster to changes in demand, and centrally manage their resources more efficiently. Cloud-native architecture is a design methodology that utilizes cloud services to allow dynamic application development techniques that take a modular approach to building, running, and updating software through a suite of cloud-based microservices rather than a monolithic application infrastructure. The cloud-native approach uses containers rather than virtual machines. Containers allow users to package software (applications, functions, or microservices, for example) with all of the files necessary to run it—while sharing access to the operating system and other server resources. This approach makes it easy to move the contained component among environments (development, test, production, etc.)—and even among clouds—while retaining full functionality. This containerization of network architecture components makes it possible to run a variety of services on the same cluster and more easily on-board already decomposed applications, while dynamically directing network traffic to the correct pods.

Network functions virtualization is a network architecture concept that uses the technologies of information technology virtualization to virtualize entire classes of network node functions into building blocks that may connect, or chain together, to create communication services. Examples of network functions or features may include session management function (SMF), enabling SRIOV (Single Root I/O virtualization) interfaces, configuring passthrough devices, real-time or specific version kernel swapping, enabling a custom GRUB (Grand Unified Bootloader) configuration, enabling huge pages, adding and configuring specific add-on packages, low latency settings, and NUMA (non-uniform memory access) alignment of processors, memory and passthrough devices.

Kubernetes, also known as K8s, is an open-source container-orchestration system for automating computer application deployment, scaling, and management. A Kubernetes cluster includes a set of worker machines or nodes to distribute workload, with each node running containerized applications. A Kubernetes node may be either a virtual or a physical machine, depending on the cluster. A Kubernetes node runs a process responsible for communication between the Kubernetes control plane and the node. The Kubernetes node manages the Pods and the containers running on a machine. A Kubernetes cluster may have a master node that controls and manages the worker nodes of the cluster and act as the frontend of the cluster.

SUMMARY

Some embodiments of the invention provide a Telco Cloud Automation (TCA) product that facilitate customization of a network function's infrastructure according to its unique requirements. The TCA receives a first function descriptor of a first network function. The first function descriptor includes a first infrastructure requirement for implementing the first network function. The TCA selects a first network cluster from a plurality of network clusters (e.g., Kubernetes clusters or sets of machines) based on the first infrastructure requirement. The TCA retrieves a first configuration data for implementing the first network function at the first network cluster. The TCA configures the first network cluster using the first configuration data.

The first infrastructure requirement for implementing the first network function and the function descriptor of the first network function are received in one cloud service archive (CSAR). The TCA may also receive a network function package at a network function catalog for the first network function. In some embodiments, the descriptor is in modified TOSCA in which a syntax of the descriptor specifies a prerequisite for cloud platform that provides an infrastructure for the plurality of network clusters or a requirement for a worker node in a Kubernetes cluster implementing the first network function.

In some embodiments, the TCA system uses a distributed inventory that stores information regarding hardware resources across multiple different cloud platforms to discover hardware resources available to serve as the plurality of network clusters. In some embodiments, each cluster in the plurality of network clusters is associated with a cluster template that reports dimension and capability of the resources of the cluster, such that the TCA selects the first network cluster by identifying a network cluster having a cluster template that indicates availability of resources that matches the first infrastructure requirement. In some embodiments, each cluster in the plurality of clusters is tagged or classified according to an intended usage that is determined according to a cluster automation policy (CAP). For example, one or more clusters are classified as workload clusters and one or more clusters are classified as management clusters. The TCA may select the first network cluster by identifying a network cluster that is tagged with an intended usage that matches the first infrastructure requirement.

The TCA may detect a difference between a desired configuration of the first network cluster according to the network function catalog and a current configuration present in the first network cluster and presenting the detected difference at a user interface.

In some embodiments, the TCA bootstraps a node configuration operator that runs as a daemon in a workload cluster to configure one or more worker nodes according to the first configuration data. The TCA also bootstraps a virtual machine configuration operator that runs in a management cluster for configuring virtual machines and virtualization software (or hypervisors) implementing the one or more worker nodes according to the first configuration data. In some embodiments, the plurality of network clusters is implemented by a plurality of cloud platforms, such that the TCA configures the first network cluster by communicating the first configuration data to a first control plane component deployed in a first cloud platform that hosts the first network cluster. In some embodiments, a control plane component of the TCA uses an API of the first cloud platform to communicate with the first network cluster.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 3 shows an example TOSCA definition document for a customized TOSCA that support infrastructure requirements definition.

FIG. 4 shows portions of a customized TOSCA using the infrastructure requirements definition.

DETAILED DESCRIPTION

Figure 1A:
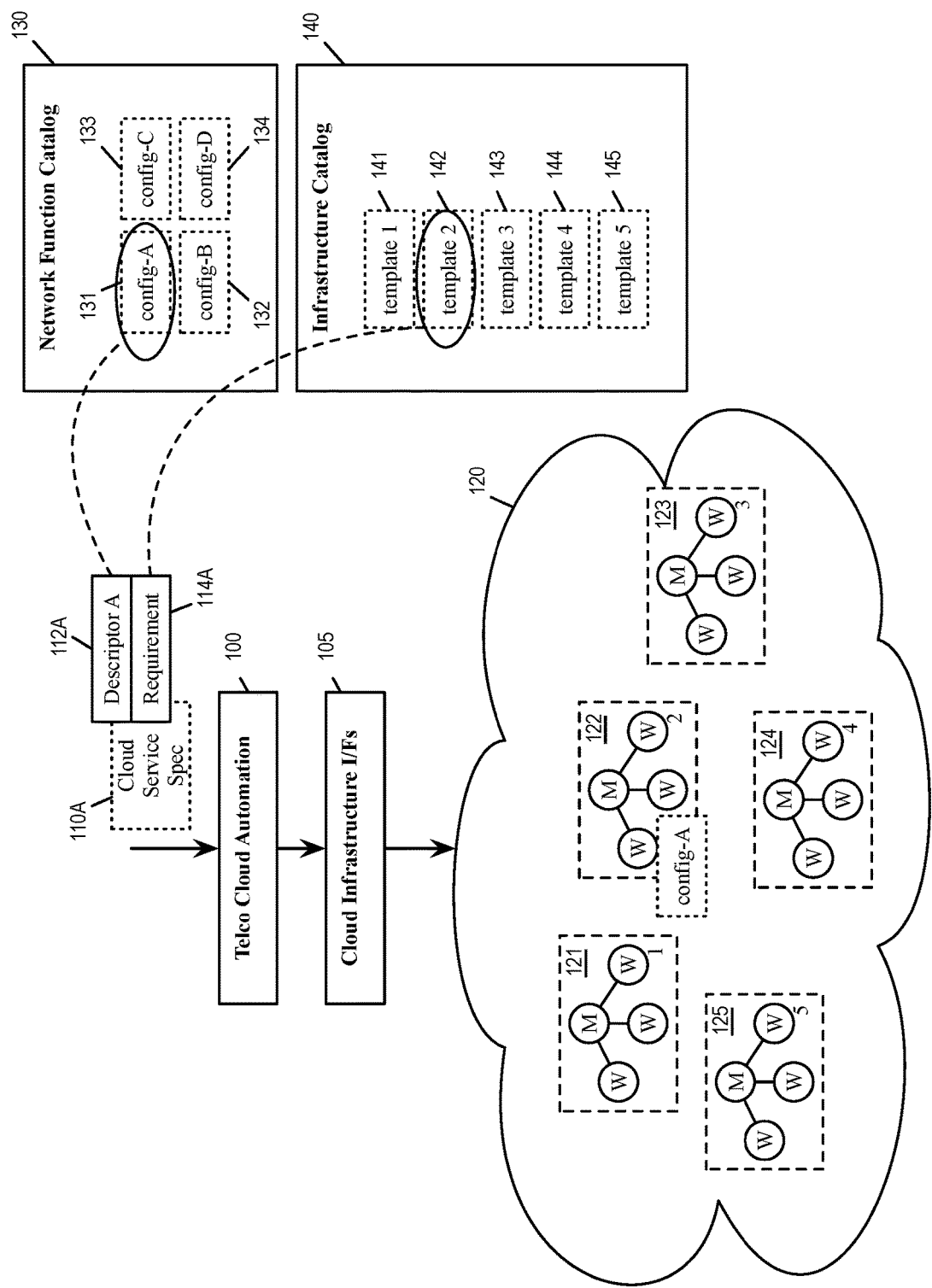
FIGS. 1A-D conceptually illustrate a Telco Cloud Automation (TCA) system that implement a network function in a cloud environment based on the network function's infrastructure requirements.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Implementation of telco network functions have moved from being purely physical to virtual. Now telco network functions have further evolved from virtual to cloud-native platforms. This allows a few lightweight communications and marshalling (LCM) operations to be made to run more optimally. Network functions usually need special purpose hardware and specific advanced software features to be enabled and tuned in order to perform optimally. This has been solved by provisioning the network functions on purpose-built bare metal servers with all the required software features enabled. Migrating a network function from one server to another may require a different set of features to be implemented or the actual underlying servers to be swapped. This is time consuming and incurs downtime. Switching to network virtualization partially solves the problem of migrating network functions, but virtual machine itself may still have to be swapped. Also, there is no consistent and generic procedure or method to capture the software requirements, which are vendor and network function agnostic.

Some embodiments of the invention provide a Telco Cloud Automation (TCA) product that facilitate customization of a network function's infrastructure according to its unique requirements. The TCA allows a user to customize a network function's infrastructure requirements. Customizing the infrastructure requirements enables a user to select a cluster, instantiate, and deploy the network functions. In some embodiments, the TCA enables deployment of network function in Kubernetes clusters, whose worker nodes are configured by the TCA to perform workload for the deployed network function. Network functions from different vendors have their own unique set of infrastructure requirements. Defining these requirements in the network functions ensure that they are instantiated and deployed in the selected cluster without user having to log in to the cluster's master or worker nodes.

In some embodiments, the feature requirements of the network functions are captured or specified in the descriptor of the network functions. The TCA parses the descriptor, and reconfigures corresponding Kubernetes nodes (e.g., virtual machines) in network clusters to realize the specified configuration. TCA may also allow the user to define Content as Service (CaaS) and Platform as Service (PaaS) components when customizing the cluster. In some embodiments, the TCA reconfigures Kubernetes nodes before instantiating the network functions.

A network function can be a CNF (containerized network function) or a VNF (virtual network function). A VNF is implemented as a virtual machine. A vendor of a VNF provides the virtual machine running on the application or the network function. A CNF is a containerized network function that is orchestrated by Kubernetes clusters rather than virtual machines. A vendor of a CNF provides only the application or the network function as the TCA provides the virtual machine to run the application. As cluster configuration of network functions provided by different vendors may differ in reliability and accuracy, a pre-certification process may be performed to certify the CNF configuration from different vendors. The certification process validate interoperability of the cluster configurations and to provision appropriate cluster configurations and toolchains.

In some embodiments, a cluster hosting a CNF is customized at instantiation to match the network function requirement of the CNF. This late binding process allows TCA to configure and allocate cloud resource on-demand based on actual awareness of application and service requirements. To deploy a CNF using the TCA system, the CNF is first on-boarded into the TCA system. The CNF may then be instantiated over a Kubernetes cluster, and the TCA may optimize the Kubernetes cluster to fit the CNF's requirement. The "on-boarding" of CNF involves the TCA receiving a network function descriptor and CSAR package of the CNF. To instantiate a CNF, the TCA locates the image repository for the CNF in the network function catalog, identify the most suitable cluster(s) to host the CNF based on the CNF's requirement, and select a node pool in the selected cluster to be customized, e.g., with specific kernel and SR-IOV configurations for the CNF. (SR-IOV allows a single physical device (e.g., PCIe) under a single root port to appear as multiple separate physical devices to the hypervisor or the guest operating system.)

When a different network function is to be provisioned on a same set of nodes, the TCA terminates or removes the existing network function application and triggers the instantiation of the new network function. Since the requirements for the new network function is captured in its descriptor, the corresponding Kubernetes node is configured dynamically for the new network function application to run. In some embodiments, the TCA migrates or swaps only the required software features for the network functions, and the hardware features are enabled/disabled on demand, instead of swapping the underlying servers or the virtual machines.

FIGS. 1A-D conceptually illustrate a Telco Cloud Automation (TCA) system that implement a network function in a cloud environment based on the network function's infrastructure requirements. The TCA 100 uses a set of cloud infrastructure interfaces 105 to communicate with computing and storage resources in the cloud 120. Some of these cloud resources constitutes network clusters (e.g., Kubernetes clusters) that can be used to perform workloads for the TCA the system, including network clusters 121-125. The TCA 100 receives cloud services specifications (e.g., CSAR or cloud service archives) for network functions from users. A cloud service specification for a network function may include a function descriptor and an infrastructure requirement for the network function. To instantiate and deploy the network function, the TCA 100 may identify a network cluster based on the infrastructure requirement and then configure the identified network cluster based on the function descriptor.

The TCA has a network function catalog 130 that is a storage or registry of configuration data for implementing various network functions. In the example, the network function catalog 130 includes configuration data 131-134 for network functions A, B, C, and D respectively. The TCA also has an infrastructure catalog 140 that provides infrastructure information (e.g., types and dimensions of the resource available in the cluster) of each network cluster. In the example, the infrastructure information of the clusters 121-125 are stored in cluster templates 141-145, respectively.

FIG. 1A illustrates the TCA system 100 receiving a cloud service specification 110A that has a function descriptor 112A and an infrastructure requirement 114A for a network function A. The TCA uses the function descriptor 112A to select configuration data 131. The TCA finds the infrastructure information in the cluster template 142 as suitable or fulfilling the infrastructure requirement 114A. Since the cluster template 142 is that of the network cluster 122, the TCA then uses the configuration data 131 to configure the network cluster 122 so that the network cluster 122 would perform the network function A, i.e., network function A is instantiated and deployed at network cluster 122.

Figure 1B:
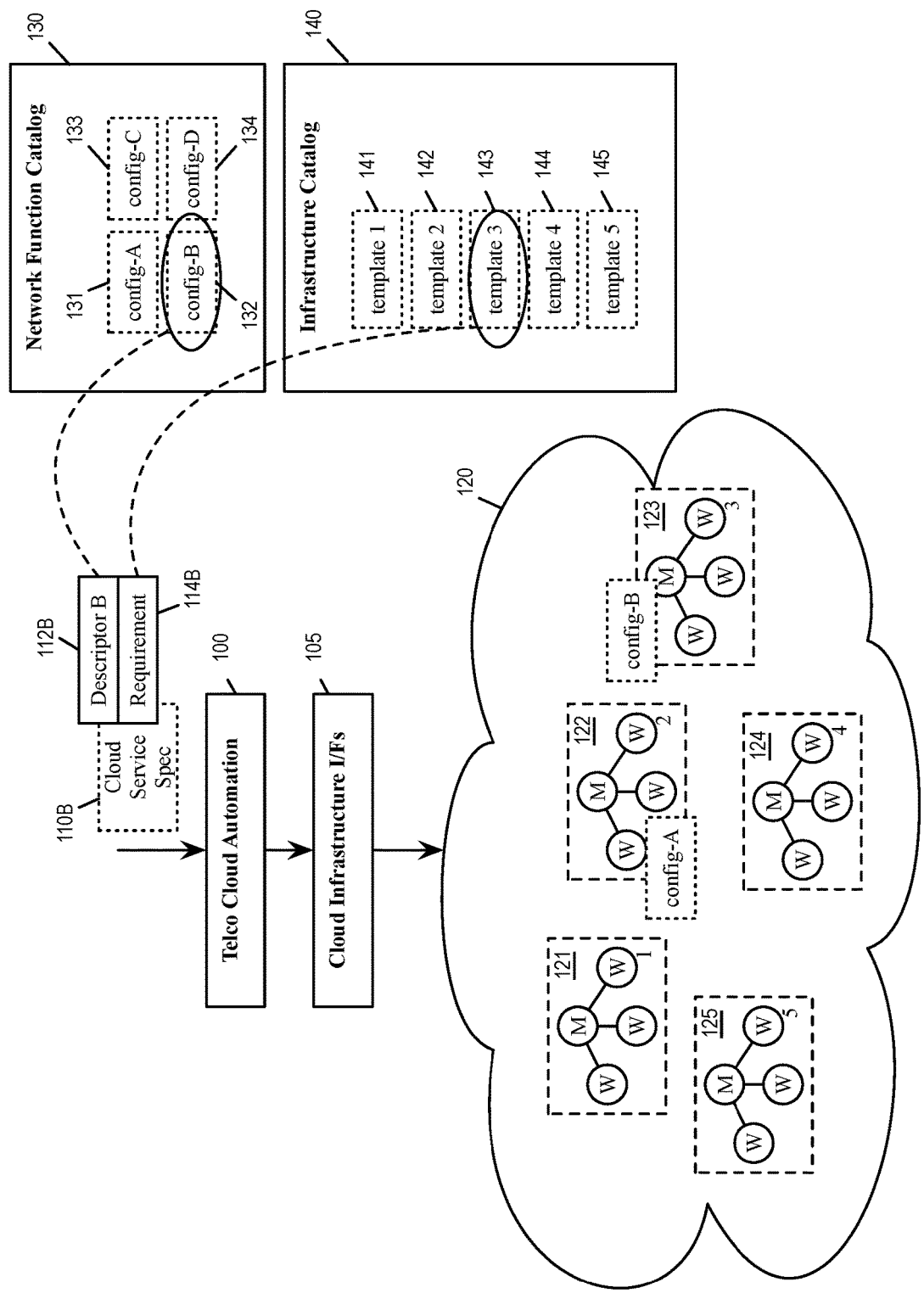

The TCA configures multiple different network cluster in the cloud to perform different network functions. FIG. 1B illustrates the TCA system 100 receiving a second cloud service specification 110B that has a function descriptor 112B and an infrastructure requirement 114B for a network function B. The TCA uses the function descriptor 112B to select configuration data 132. The TCA finds the infrastructure information in the cluster template 143 as suitable or fulfilling the infrastructure requirement 114B. Since the cluster template 143 is that of the network cluster 123, the TCA then uses the configuration data 132 to configure the network cluster 123 so that the network cluster 123 would perform the network function B (e.g., provide network function B as a cloud service.) In the meantime, the network cluster 122 continue to provide network function A.

Figure 1C:
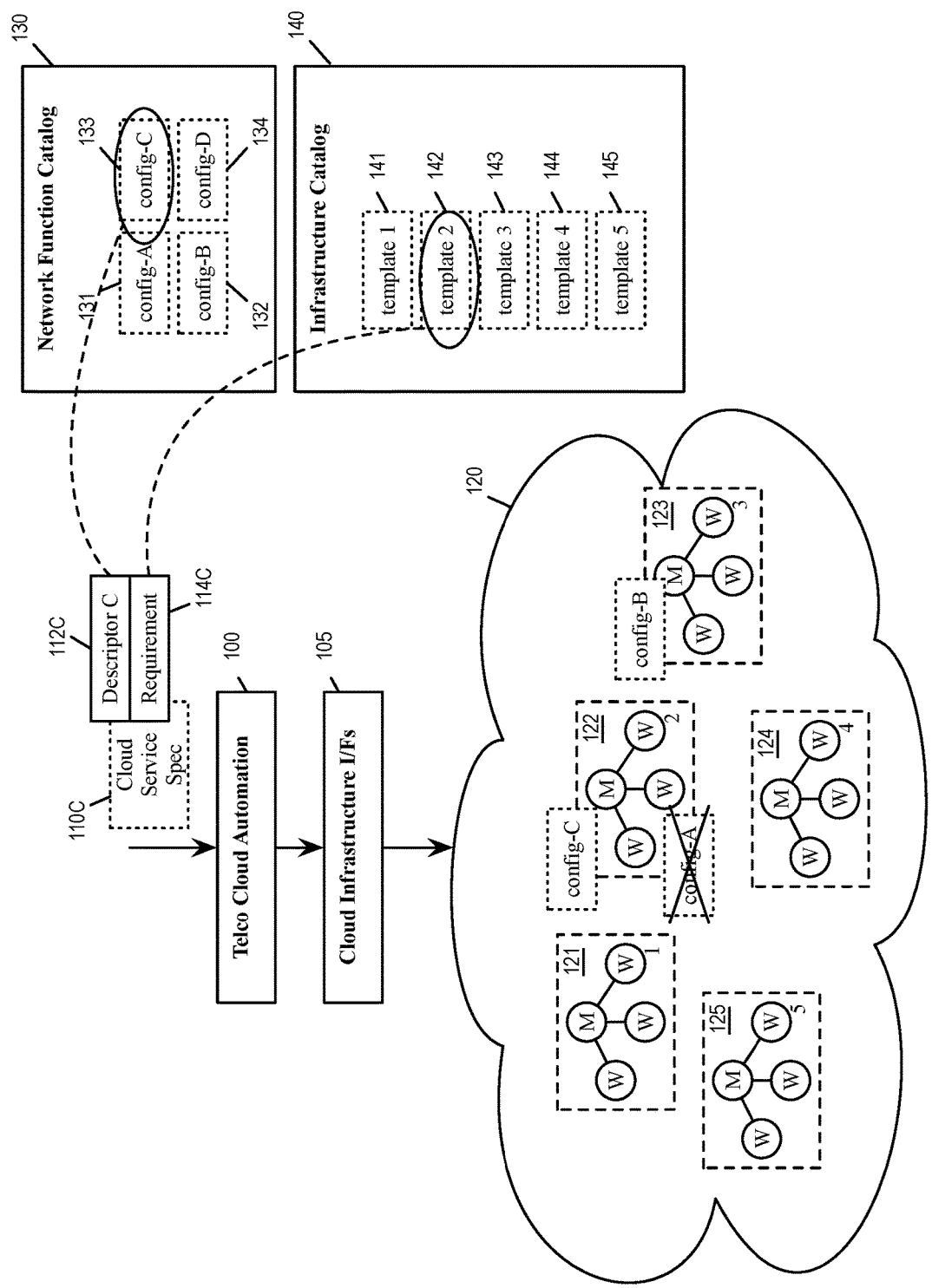

The TCA may reconfigure a network cluster to perform a different network function. FIG. 1C illustrates the TCA system 100 receiving a third cloud service specification 110C that has a function descriptor 112C and an infrastructure requirement 114C for a network function C. The TCA uses the function descriptor 112C to select configuration data 133. The TCA finds the infrastructure information in the cluster template 142 as suitable or fulfilling the infrastructure requirement 114C. The cluster template 142 is that of the network cluster 122. The network cluster 122 is configured to perform the network function A, but the TCA uses the configuration data 133 to reconfigure the network cluster 122 so that the network cluster 122 would perform the network function C instead of network function A.

Figure 1D:
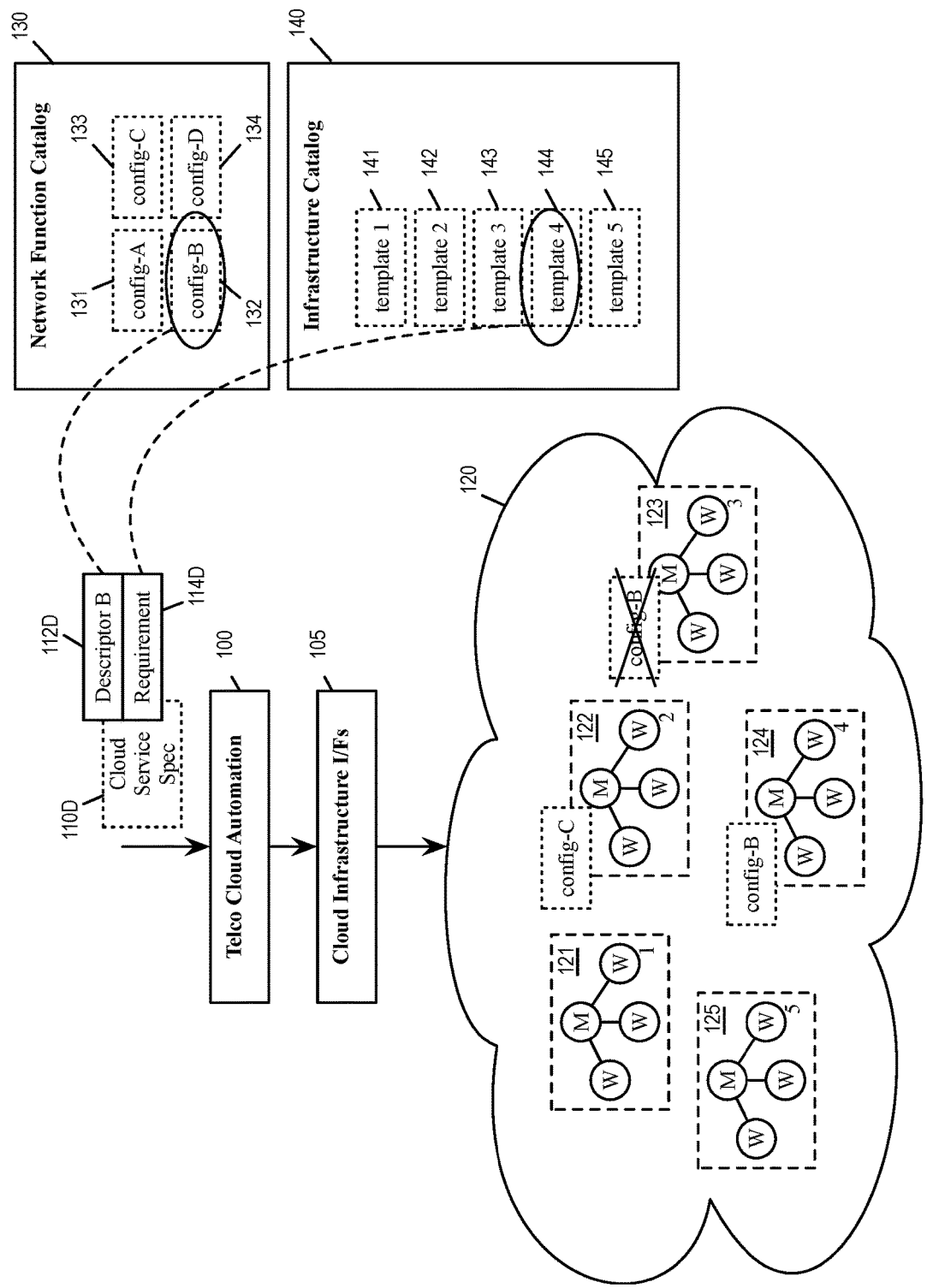

The TCA may move or migrate a network function from one network cluster to another. FIG. 1D illustrates the TCA system 100 receiving a fourth cloud service specification 110D that has a function descriptor 112D and an infrastructure requirement 114D for the network function B. The TCA uses the function descriptor 112D to select configuration data 132. The TCA finds the infrastructure information in the cluster template 144 as suitable or fulfilling the infrastructure requirement 114D. Since the cluster template 144 is the that of the network cluster 124, though the network function B is already running at network cluster 123, the TCA uses the configuration data 132 to configure the network cluster 124 so that the network cluster 124 would perform the network function B. Thus, the network function service B is migrated from network cluster 123 to the network cluster 124, without swapping physical servers or virtual machines.

A cluster template, or more specifically, a Kubernetes cluster template, is a blueprint of a Kubernetes cluster and contains the required configuration. In some embodiments, when a Kubernetes cluster is created or deployed, a corresponding Kubernetes cluster template is created. The user may use the TCA to create a Kubernetes cluster template, upload, download, edit, and use it for deploying one or more clusters. A Kubernetes cluster template defines whether the Kubernetes cluster is a management cluster or a workload cluster. A management cluster is a Kubernetes cluster that performs the role of the primary management and operational center. In some embodiments, the management cluster is used to create workload clusters. Workload clusters are where the actual workload resides. Network functions are deployed on the workload clusters.

In some embodiments, a Kubernetes cluster template (whether for management or workload) includes two types of configuration information: (1) a cluster configuration and (2) a master node and worker node configuration. The cluster configuration may specify information such as the Container Storage Interfaces (CSI), Container Network Interface (CNI), versions of Kubernetes and Helm Chart used, etc. The master and worker node configuration specifies details such as the storage, CPU, memory size, number of networks, labels, number of replicas for the master nodes and worker nodes.

In some embodiments, available infrastructure resources in the cloud are identified, grouped, and/or classified. TCA discovers available cloud computing resources via a distributed inventory (also referred to as Hybrid Inventory), which is a collection of resource inventories across different parts or aspects of the cloud. This facilitates deployment of the network functions, specifically when identifying suitable resources for deploying higher-level components. In some embodiments, the TCA maps the resources in the infrastructure according to different Cluster Automation Policies (CAPs). Each CAP indicates a type of intended usage for infrastructure resources. The TCA then maps the discovered resources to a set of different CAPs.

For example, network cluster(s) to be used for management are grouped in a management CAP. Cluster(s) to be used for Kubernetes cluster deployment, and Cluster(s) to be used for VNF deployment can be grouped in different CAPs. In some embodiments, TCA associates each of these constructs (CAPs) with tags so TCA can quickly identify the resources in those constructs according to their intended usage. In some embodiments, each CAP is defined in terms of cloud platform (e.g., VMware vSphere) tags that are assigned to the underlying resources.

In some embodiments, the TCA deploys Kubernetes clusters for a network function by using a mapping between the CAPs and the cluster templates. The TCA selects a network (Kubernetes) cluster by (i) identifying a CAP having a particular type of intended usage that matches the infrastructure requirement of the specified network function, and (ii) searching the cluster templates identified by the identified CAP (e.g., cluster templates that are tagged) for a network cluster having a cluster configuration that matches (or fits) the infrastructure requirement of the network function (e.g., having suitable Kubernetes version, processing capacity, memory capacity, number of worker nodes, etc.).

Figure 2:
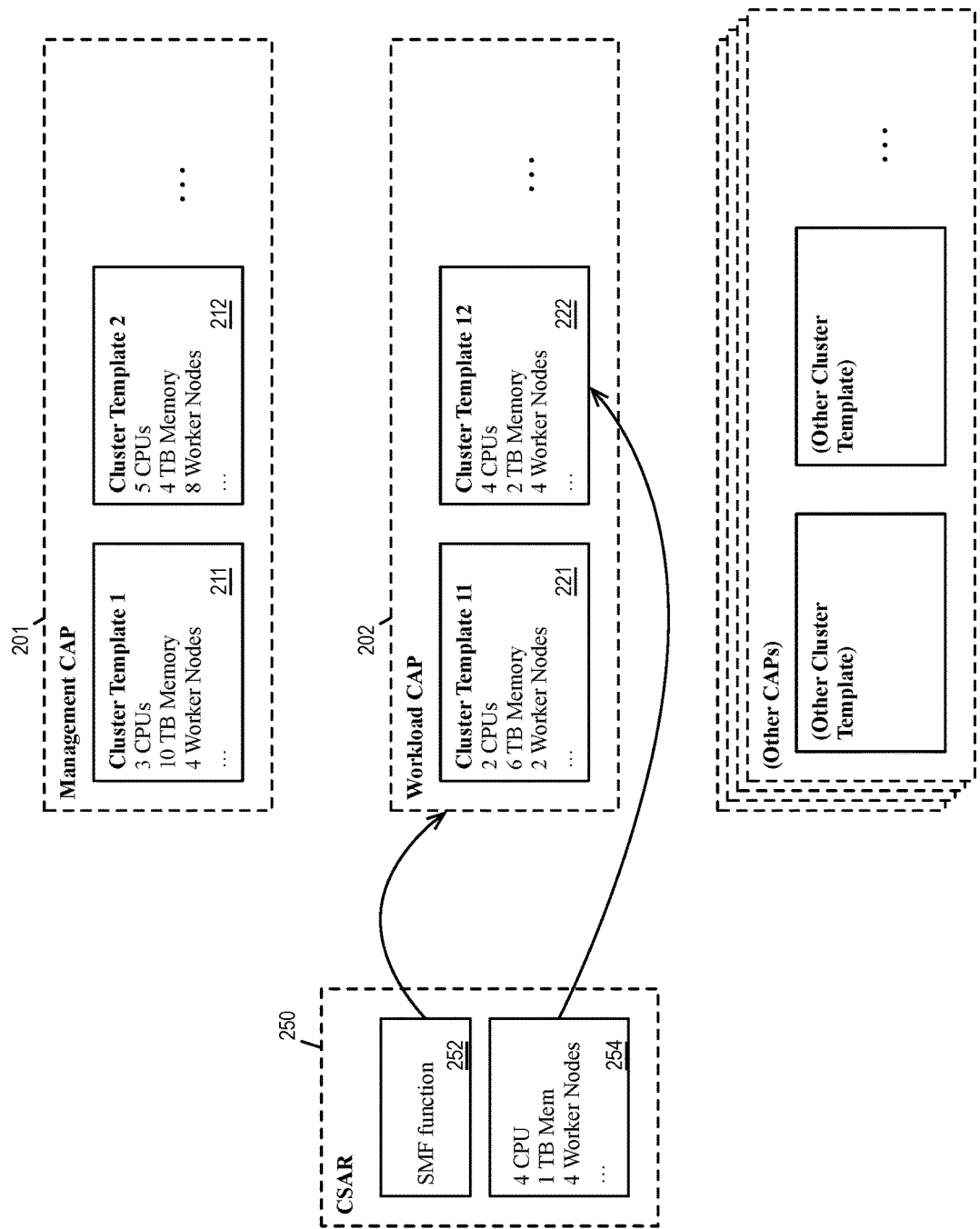
FIG. 2 conceptually illustrates using the infrastructure requirement of a network function to select a network cluster.

FIG. 2 conceptually illustrates using the infrastructure requirement of a network function to select a network cluster. In the example, network clusters in the cloud that are available for network function deployment are identified by cluster templates. Each cluster template stores the cluster configuration (e.g., compute resources available, performance metrics, number of worker nodes available) of its corresponding network cluster. The cluster templates are classified into several groups that correspond to several different CAPs. For example, cluster templates 211 and 212 are classified and tagged as having intended usage of a management CAP 201, while the cluster templates 221 and 222 are classified and tagged as having intended usage of a workload CAP 202.

In the example, the TCA receives a CSAR 250 that includes a function descriptor 252 and an infrastructure requirement 254. Based on the functional descriptor 252, the TCA selects the workload CAP 202 as the intended usage of the CAP 202 matches the functional descriptor 252. The TCA searches the cluster templates of the CAP 202 and selects the cluster template 222 as having the cluster configuration that matches the infrastructure requirement 254. The TCA may then instantiate the network function by configuring a Kubernetes cluster that corresponds to the cluster template 222 to perform the network function.

User may use TCA to upload a standard (e.g., SOL001/SOL004) compliant Virtual Network Function Descriptor (VNFD) and Cloud Service Archive (CSAR) package. The system parses (the descriptor) and validates the configuration, and presents the topology in a visual viewer. It then persists the entry into the Network Function Catalog. In some embodiments, the TCA processes VNFD that complies with specific format such as CSAR, specific standard such as SOL001 or SOL004, and specific profile standard such as TOSCA simple profile in YAML or TOSCA simple profile for NFV.

A Virtual Network Function Descriptor (VNFD) file describes the instantiation parameters and operational behaviors of the VNFs. Cloud Native Network Function Descriptor (CNFD) file describes the instantiation parameters and operational behaviors of the CNFs. The TCA provides tools for designing SOL001-compliant VNFDs and CNFDs. The TCA further allows customization of the Kubernetes cluster with custom infrastructure requirements like custom packages, network adapters, kernels, etc., using infrastructure designer. In some embodiments, these customizations are available only for CNF components.

To customize the cluster according to network function requirements, the requirements must be added in the network function catalog. The TCA adds the custom extension called "infra-requirement" to the TOSCA. The user can use this extension to define the (worker) node, Containers as a Service (CaaS), and Platform as a Service (PaaS) components. Under "node_components" the requirements for the (worker) node can be defined. These requirements include kernel type, kernel version, kernel arguments, required packages, tuned configuration. You can also define additional networks to be configured for the worker node. All the changes are applied on the worker nodes of the node pool. Under "caas_component", the CaaS components such as CNIs to be installed on each worker node can be defined. After the components of infra_requirements are defined in the CNF catalog, the node pool is customized according to the differences detected between the CNF catalog and the actual configuration present in the node pool during instantiation.

Network functions descriptors describes the instantiation parameters and operational behaviors of network functions, including virtual network functions (VNFs) and/or containerized network functions (CNFs). A network function descriptor contains requirements for onboarding and managing the life cycle of a network function. (Onboarding a network function refers to user uploading a network function package to the network function catalog.) The TCA can be used to upload a network function descriptor and CSAR package. In some embodiments, the TCA parses and validates the configuration, and presents the topology in a visual viewer. The TCA then persists the network function as an entry into the Network Function Catalog.

In some embodiments, the TCA is leveraged to provide a platform for defining network function in a vendor and network function agnostic way. For example, the cloud service specification 110A-D are in CSAR format, which is defined in ETSI SOL004, while the function descriptors 112A-D are in formats compliant with SOL001 standard. In some embodiments, a custom extension is added to a descriptor for the network function, and a section is defined via the descriptor to capture the exact software feature requirements needed by the application to run optimally.

In some embodiments, the TCA allows customization of a network function's infrastructure according to the network function's unique requirements. The user may create a cluster, customize the infrastructure, and deploy the network functions without any manual user inputs. Network functions from different vendors may have their own unique set of infrastructure requirements. Defining these requirements in the network functions ensure that they are instantiated and deployed in a cluster without having to log into the network cluster's master or worker nodes. In some embodiments, the infrastructure requirement of a network function can be specified in the network function catalog entry for the network function.

Topology and Orchestration Specification for Cloud Applications (TOSCA) is an open-source language used to describe the relationships and dependencies between services and applications that reside on a cloud computing platform. In some embodiments, a descriptor of a network function is in a form of a TOSCA file. Node pools of each cluster (a node pool is a group of nodes within a cluster that have the same configuration) can be customized using network function catalog defined in a TOSCA file. In some embodiments, the TCA uses network function TOSCA extensions to determine the requirements for different virtual infrastructure managers (VIMs) of different cloud platforms. Features enabled or disabled through TOSCA extensions may include: SRIOV Interface addition and configuration, NUMA alignment of vCPUs and VF/PFs, Latency sensitivity, Tuned profile DPDK binding for SRIOV interfaces, Kernel Update, Kernel Modules, Custom package installations (pciutils, lxcfs.), GRUB configuration, Passthrough devices for PTP, etc.

In some embodiments, the TCA recognizes a custom extension to TOSCA for specifying infrastructure requirement. In this TOSCA extension (called "infrastructure_requirement" in some embodiments), node, Containers as a Service (CaaS), and Platform as a Service (PaaS) components can be defined. For example, under syntax element "node_component", the requirements of a worker node, such as kernel type, kernel version, kernel arguments, required packages, tuned configuration can be defined. As another example, under the syntax element caas_component, CaaS components to be installed on each worker node can be defined. In some embodiments, the node components and CaaS components in TOSCA can be modified for different Kubernetes VIMs. In some embodiments, TOSCA is customized to support various network functions for worker nodes in Kubernetes clusters. These customizations may include the kernel-related changes, custom packages installations, network adapter, SRIOV, DPDK configurations, and CPU Pinning of the worker nodes on which the network functions are deployed.

The TCA may also use a modified TOSCA, specifically an extension of the standard TOSCA, to determine prerequisites for different VIMs. For example, a root node syntax (called "tosca.nodes.nfv.VNF") defines the VNF definition such as CaaS and NodeConfig related requirements in TOSCA, while a particular property ("infra_requirement") at the root node defines various infrastructure requirement for the network function.

Elements needed to define a TOSCA Service are provided in TOSCA Definitions documents. FIG. 3 shows an example TOSCA definition document for a customized TOSCA that support infrastructure requirements definition. FIG. 4 shows portions of a customized TOSCA using the infrastructure requirements definition.

Figure 5:
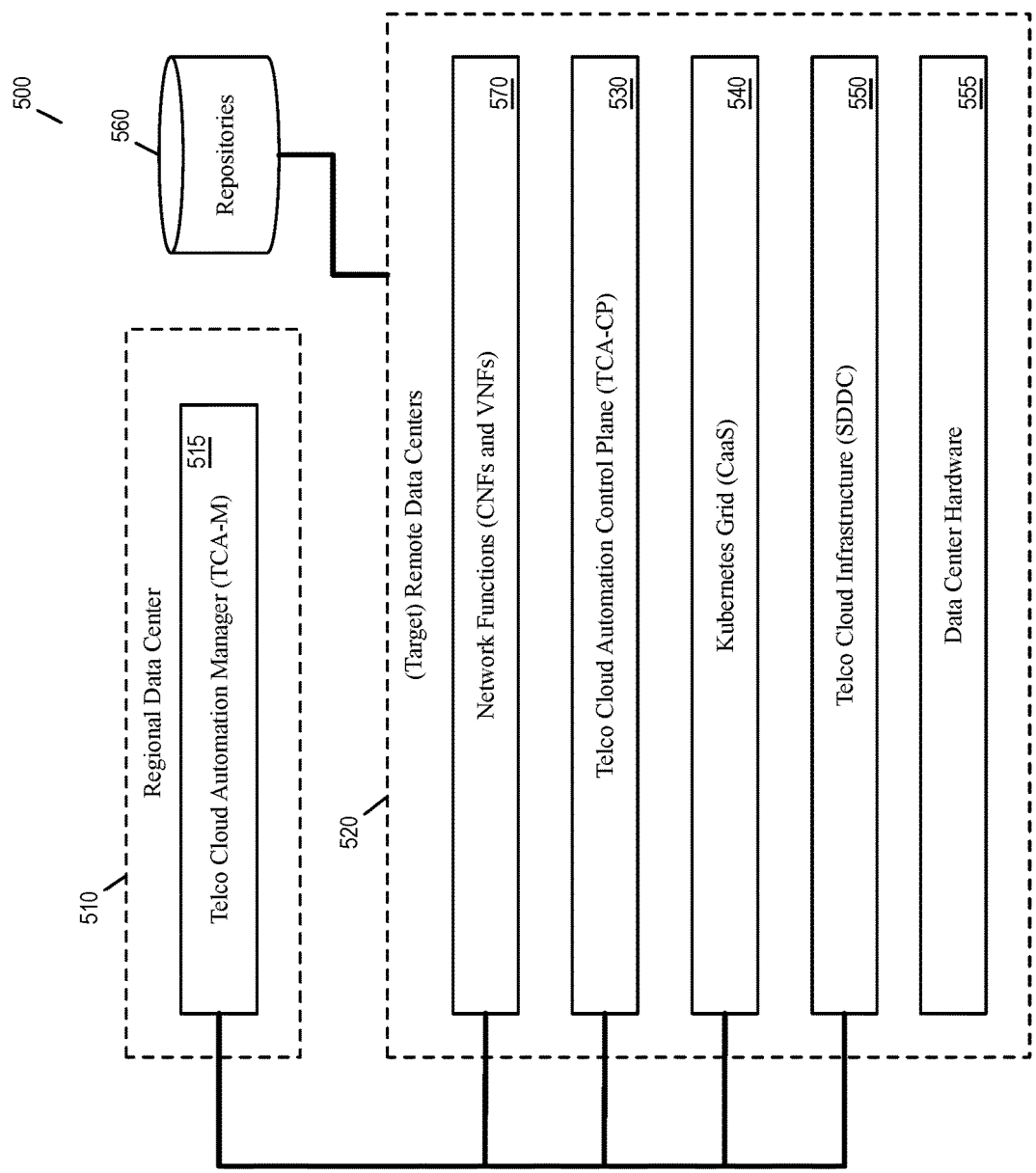
FIG. 5 conceptually illustrates a TCA system in a cloud environment.

FIG. 5 conceptually illustrates a TCA system in a cloud environment. As illustrated, a TCA system 500 operates in a cloud environment that spans multiple data centers, including a regional or local data center 510 and one or more remote (or target) data centers 520. For some embodiments, the remote data centers 520 may generally refer to parts of the cloud beyond the regional data center 510 that are accessible from the regional data center 510.

The TCA system 500 includes at least two components: (1) a TCA Manager (TCA-M) 515 that provides Telcos with network function virtualization (NFV) management and orchestration (MANO) capabilities and enables the automation of deployment and configuration of network functions and network Services, and (2) a TCA Control Plane (TCA-CP) 530 that provides the infrastructure for placing workloads across clouds using the TCA. The TCA manager 515 operates in the regional data center 510 and the TCA control plane 530 operates in the remote data centers 520. The TCA manager 515 receives inputs from users, including CSARs that defines network functions and infrastructure requirements. The received input is used to automatically deploy network functions in the remote data centers 520, and to do so by finding or creating network clusters (Kubernetes clusters) of nodes according to the infrastructure requirement.

As illustrated, the resources of the remote data centers 520 (data center hardware 555) are accessible via several overlay components, including the TCA control plane overlay 530, a Kubernetes grid overlay 540, and a telco cloud infrastructure overlay 550. The TCA system uses infrastructure constructs provided by these overlay components to deploy network functions 570. Specifically, the TCA control plane (TCA-CP) 530 coordinates with the TCA manager 515 to perform TCA operations such as parsing CSARs and instantiating network functions. The Kubernetes grid overlay 540 identifies network resources as Kubernetes clusters by pre-configuring Kubernetes clusters to facilitate provisioning and management operations according to a particular standard (e.g., VMware Tanzu®). The telco cloud infrastructure overlay 550 provide support for the data center's hardware 555 to be used as part of software-defined data center (SDDC).

The TCA system 500 also uses a set of repositories 560 for software images. These software images may include configuration data for configuring network clusters to perform various network functions (CNFs and/or VNFs). The set of repositories may be part of a distributed inventory management system, which is also referred to as a hybrid inventory. The distributed inventory management system enables the TCA manager 515 to gather the infrastructure status and details from various SDDC infrastructures. The set of repositories 560 may also store various cloud definition templates such as cluster templates and CAPs that are designed and uploaded by the user or administrator of the TCA.

In some embodiments, the TCA manager 515 bootstraps the TCA control plane overlay 530, the Kubernetes grid overlay 540 (thereby bootstraps the Kubernetes clusters), and the telco cloud infrastructure overlay 550. (Bootstrap causes a hardwired program to read a bootstrap program from an input unit. The computer would then execute the bootstrap program, which causes it to read more program instructions.) The TCA manager 515 then instantiates the network functions (CNFs and/or VNFs) 570 and other network services (CaaS and PaaS) at the Kubernetes grid overlay 540. The configurations of the Kubernetes clusters may then be further optimized for the deployed network functions 570 in a late binding process. The TCA control plane 530 may also perform post deployment configuration and registration to element management system (EMS), operations support system (OSS), and/or Lightweight Communications and Marshalling system (LCM).

In some embodiments, as part of the TCA system, specialized or custom operators are installed in the remote data center 520 to facilitate the configuration of Kubernetes clusters and virtual machines when instantiating network functions. In some embodiments, a node configuration operator (NodeConfig operator) runs as a daemon in a workload cluster (e.g., at each worker node) to configure one or more worker nodes according to a set of configuration data. In some embodiments, a virtual machine configuration operator (VMConfig operator) runs in a management cluster to configure virtual machines and virtualization software (or hypervisors) implementing the one or more worker nodes according to the set of configuration data. VMConfig and NodeConfig Operators are Kubernetes operators developed to handle the Kubernetes node and OS customization with the goal of ensuring that the Tanzu Standard for Telco Kubernetes cluster is configured based on the 5G workload requirements. In some embodiments, cluster-level or worker node-level operations such as DPDK (data plane development kit) binding, Kernel upgrade, OS module installation operations can be customized by using the NodeConfig Operator, while VM or network virtualization related operations such as vNIC mapping, Network PortGroup assignment, vCPU pinning, and host memory reservation are handed by the VMConfig Operator.

In some embodiments, based on infrastructure parameters defined in the CNF CSAR file (e.g., 110A-D), TCA pushes the intended state of the node's configuration to the NodeConfig and VMConfig Operators. TCA is the single source of truth for both VMConfig and NodeConfig operators. In some embodiments, based on the infrastructure requirements defined in the network function descriptors (e.g., TOSCA YAML or CSAR files) in the network function catalog, TCA generates a node profile that describes the intended node configuration to be realized by the NodeConfig operator. Node Profile describes the intent of NodeConfig operator and is stored as a Kubernetes ConfigMap (configuration map) at individual Kubernetes nodes. A node profile contains a set of configuration for nodes running a specific type of workloads. Different profiles could be applied to different nodes based on the type of workloads running on nodes. In some embodiments, the NodeConfig operator is only used for deploying CNFs but not VNFs, while the VMConfig operator is used for both CNFs and VNFs.

Figure 6:
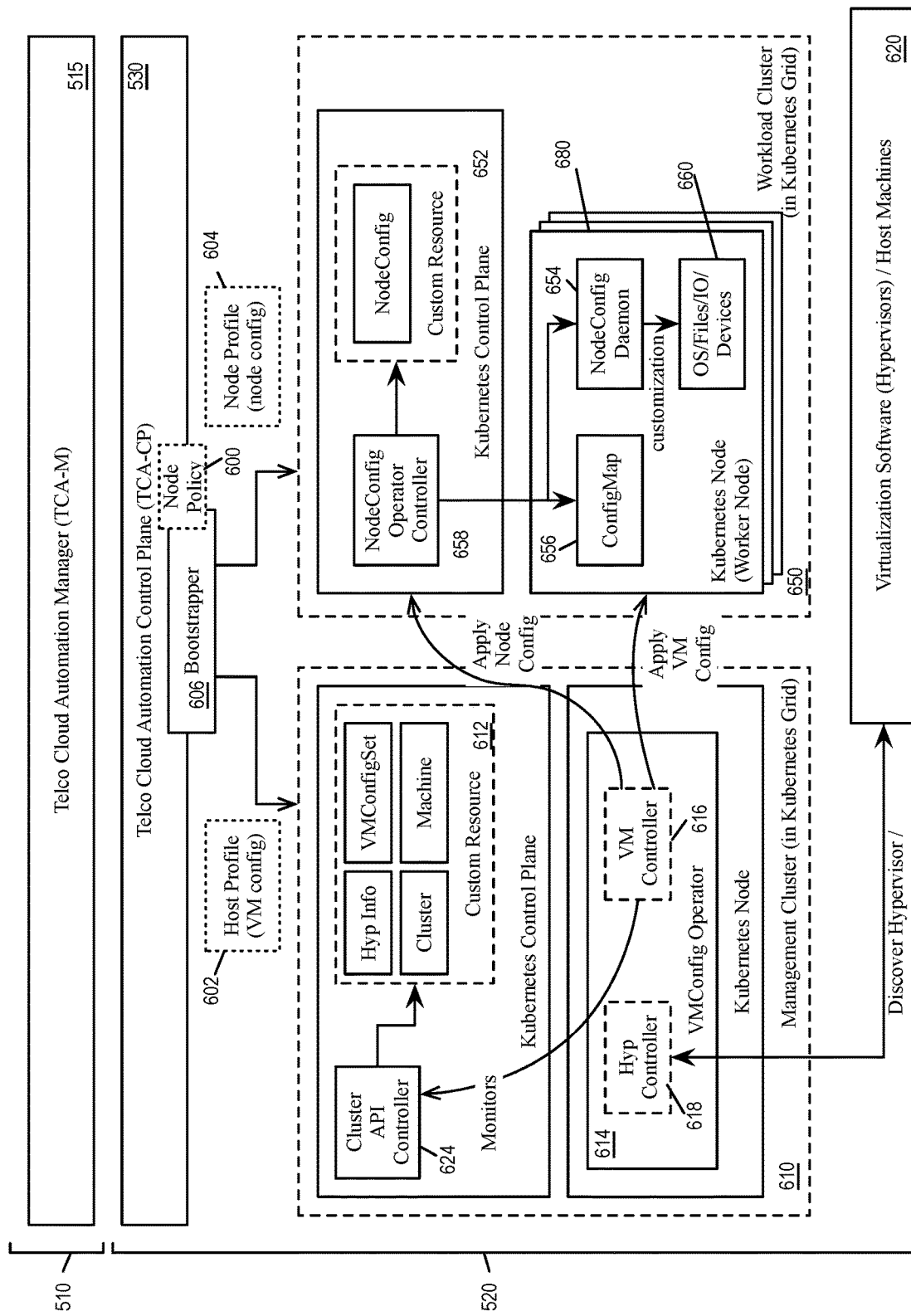
FIG. 6 conceptually illustrates custom operators for instantiating network functions in a TCA system.

FIG. 6 conceptually illustrates custom operators for instantiating network functions in a TCA system. As illustrated, inside the TCA-CP appliance 530, the TCA system 500 generates a node policy 600 for specific workload cluster and specific nodes pool resource. The TCA has a Kubernetes bootstrapper service 606 that is responsible for parsing and translating the node policy 600 into a host profile 602 and a node profile 604 for clusters in the Kubernetes grid. Specifically, the bootstrapper service 606 provides the host profile 602 as custom resources (CR) 612 for the VMConfig Operator operating in a management cluster 610 and the node profile 604 as custom resources 652 for the NodeConfig Operator operating in a workload cluster 650. The operations of the workload cluster 650 is managed by one or more nodes of the management cluster 610.

The NodeConfig operator of the workload cluster 650 runs as a daemon 654 on Kubernetes nodes 680 and configures the Kubernetes node 680 to realize the desired states specified by TCA. The NodeConfig daemon 654 is a daemonset running per node to realize the node profile 604 passed down to the NodeConfig Daemon 654 as configuration map 656. The NodeConfig Operator is a Kubernetes operator that handles the node OS configuration, performance tuning, OS upgrade. A NodeConfig Operator controller 658 monitors configuration update events and forwards events to backend daemon plugins. There are multiple daemon plugins, and each plugin is responsible for a specific type of event such as tuning, package updates, SR-IOV device management, and so on (as represented by OS/Files/IO/device drivers 660).

The VMConfig operator 614 of the management cluster 610 is a controller that handles VM configurations for a Kubernetes cluster (e.g., the workload cluster 650) for e.g., SRIOV adapters, VM parameters, memory reservation, CPU pining, etc. The VMConfig operator 614 includes a VM Controller 616 and a hypervisor information controller 618. In some embodiments, the VMConfig operator configures VMs of the workload cluster 650 to meet an infrastructure requirement of the first network function.

In some embodiments, the VMConfig operator configures VMs of the management cluster 610 and of the workload cluster 650 according to a customized resource definition provided by the host profile 602. The VM Controller 616 monitors (through a cluster API controller 624) the events of custom resources 612 (such as "Cluster", "Machine", and "VMConfigSet"), and performs VM customization based on the data of the custom resources 612. The VM Controller 616 also monitors VM configuration events and configures Kubernetes worker nodes (e.g., Kubernetes node 680) on the target workload cluster 650. The VM controller 616 also monitors cluster API events with a virtualization or cloud platform (e.g., VMware CAPI/CAPV). The hypervisor controller 618 ("Hyp controller") is responsible for hardware capabilities discovery on host machines 620 that runs virtualization software or hypervisors to operate VMs. The hypervisor controller 618 is also responsible for managing hypervisor inventory and discovering the hardware capabilities (CPU, Memory, NUMA nodes, FPGA, GPU, NIC etc.) of host machines that host VMs. The hypervisor controller 618 also manages the hardware resource allocation.

In some embodiments, the operations of the VMConfig and NodeConfig Operators are triggered by the deployment of a network function (CNF and/or VNF). Network Functions (NF) from various vendors have NF-specific requirements on the Kubernetes grid infrastructure. In some embodiments, in order to ensure that the Kubernetes cluster is equipped with required tuning, the TOSCA descriptor is extended to include the NF's infrastructure requirements. In some embodiments, infrastructure requirements are captured as custom extensions in the descriptor file part of the TOSCA YAML (CSAR). The NFs are uploaded as a catalog offering based on the ETSI-compliant CSAR package. After the NF is consumed from the TCA catalog and a placement decision is made, TCA generates the host profile 602 and the node profile 604 based on the TOSCA descriptor and pushes the profile to the VMConfig and NodeConfig Operators. NodeConfig Operator processes the node profile and updates the corresponding ConfigMap for NodeConfig daemonset to realize the instantiation of the network function. In some embodiments, the host profile 602 includes a custom resource definition (CRD) that is a configuration set for multiple VMs (VMConfigSet). The VMConfig operator uses the configuration set to create corresponding configuration data for the multiple VMs that are encompassed by the configuration set.

In some embodiments, the VMConfig operator 614 runs in the management cluster 610 under the same namespace as cluster API (e.g., CAPV) controllers. In the management cluster 610, each workload cluster (including the workload cluster 650) being managed sits in its own namespace.

Figure 7:
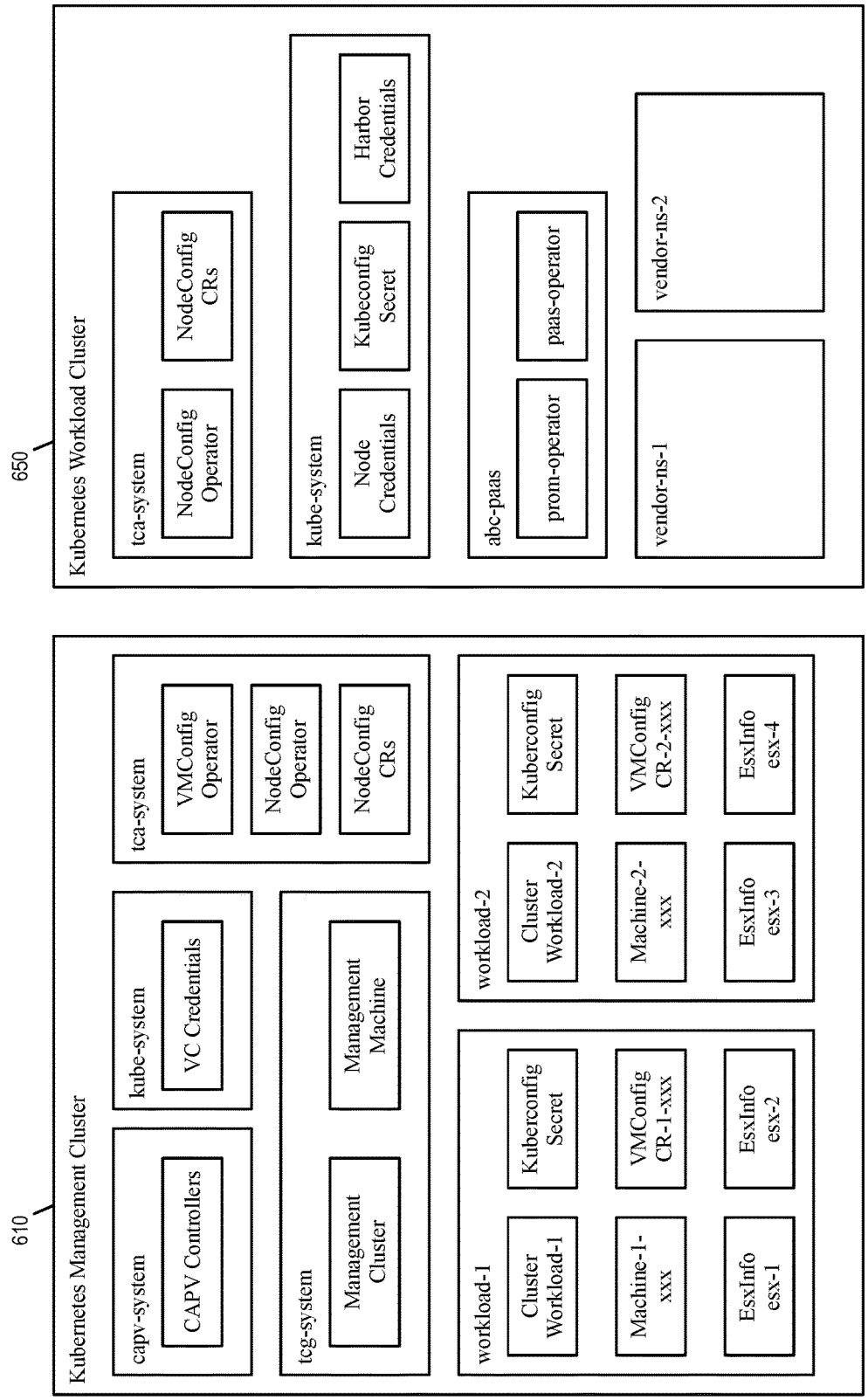
FIG. 7 shows an example namespace layout in a management cluster and a workload cluster.

FIG. 7 shows an example namespace layout in a management cluster and a workload cluster. As illustrated, the VMConfig Operator and the NodeConfig Operator sit in a "tca-system" namespace that is in both the management cluster 610 and the workload cluster 650 being managed. The VMConfig data for a VM is created in its own cluster's namespace ("workload-1" or "workload-2") in the management cluster. NodeConfig custom resource 652 is created in the tca-system namespace which is applied cluster-wise on both the management cluster 610 and the workload cluster 650. Credentials are stored in a "kube-system" namespace ("VC Credentials" in the management cluster 610 and "Node Credentials" in the workload cluster 650).

In some embodiments, the TCA-CP of the TCA system is deployed across the Virtual Infrastructure Managers (VIMs)

of different cloud platforms. A VIM is a functional block for management and orchestration (MANO) and is responsible for controlling, managing, and monitoring the NFVI (network function virtualization infrastructure) compute, storage, and network hardware, the software for the virtualization layer, and the virtualized resources. The VIM manages the allocation and release of virtual resources, and the association of virtual to physical resources, including the optimization of resources. Cloud platforms such as Cloud Director®, vSphere®, Kubernetes Cluster, and OpenStack can be managed and controlled by respective VIMs. Each VIM has a corresponding TCA-CP that connects with the TCA manager and is paired with the TCA manager so that the TCA may support different feature sets on different types of VIMs.

In some embodiments, the TCA may deploy network functions in network clusters behind multiple different cloud platforms. Thus, when TCA determines that a network cluster satisfies the infrastructure requirement of a network function being instantiated, and that the network cluster is managed and controlled by a particular VIM of a particular cloud platform, the TCA may configure the network cluster by communicating with the TCA-CP of the particular VIM. The TCA-CP may use an API of the particular VIM to configure the network cluster to instantiate the network function. The TCA may use the distributed hybrid inventory to discover the infrastructure resources that are available in different cloud platforms and select the cloud platform that has the suitable infrastructure resource for the network function's requirement.

Figure 8:
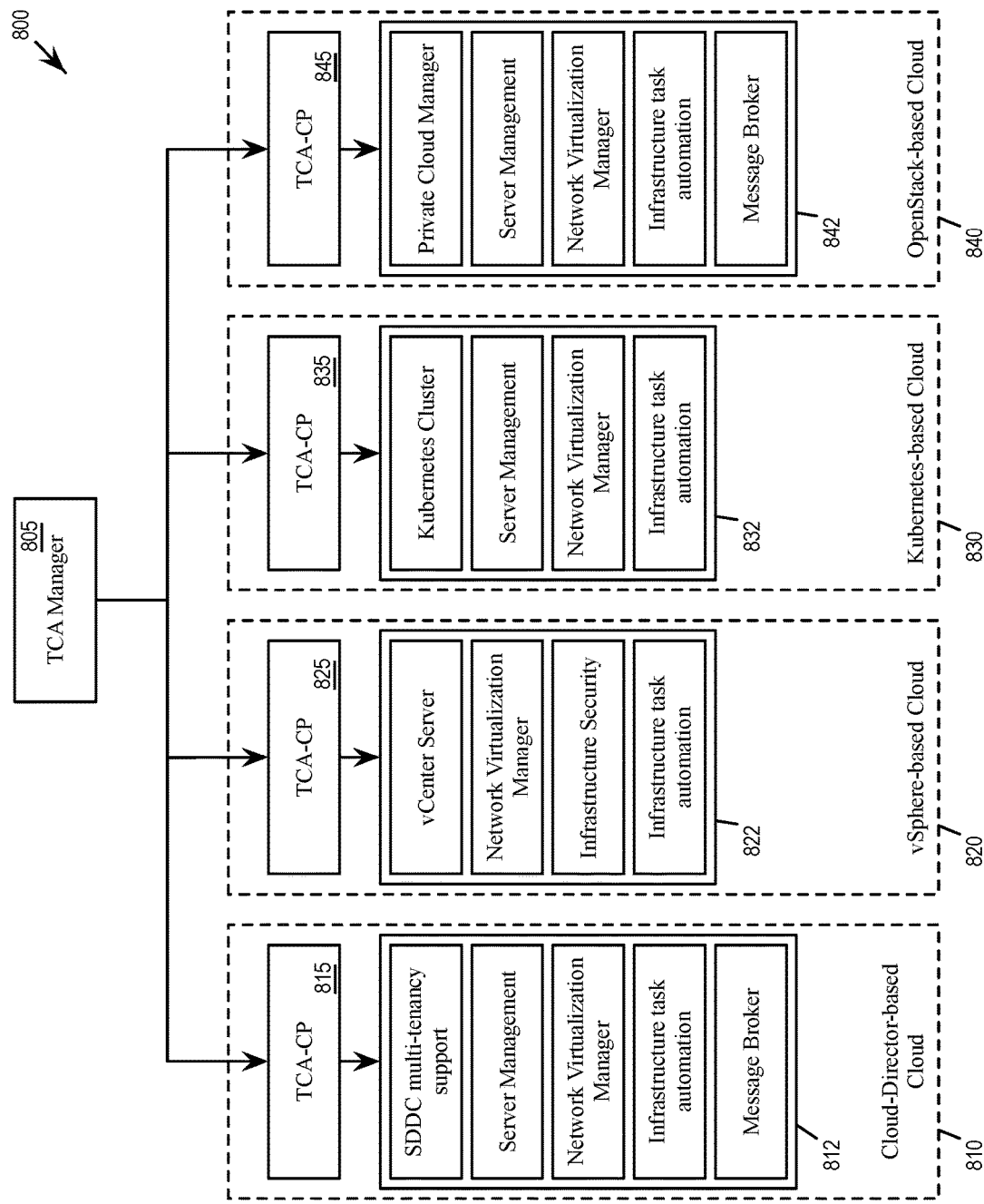
FIG. 8 conceptually illustrates a TCA system that is implemented over multiple cloud platforms.

FIG. 8 conceptually illustrates a TCA system that is implemented over multiple cloud platforms. The TCA 800 is capable of instantiating network functions across four different cloud platforms, specifically a Cloud Director-based cloud 810, a vSphere-based cloud 820, a Kubernetes based cloud 830, and an OpenStack-based cloud 840. The cloud platforms 810, 820, 830, and 840 are managed by VIMs 812, 822, 832, and 842, respectively. Each VIMs include several component software for managing cloud resources, such as software for SDDC multi-tenancy support (e.g., VMware Cloud Director®), software for infrastructure security (VMware vCenterPSC®), software for private cloud manager (e.g., VMware Integrated OpenStack), software for server management (e.g., VMware vCenter Server®), software for managing network virtualization (e.g., VMware NSX®), software for infrastructure task animation (e.g., VMware vRealize Orchestrator®), or message broker software (e.g., RabbitMQ).

The VIMs are connected to a TCA manager 805, as each VIM has a corresponding TCA-CP that is paired with the TCA manager 805. As illustrated, TCA-CP 815, 825, 835, and 845 are installed for the VIMs 812, 822, 832, and 842, respectively. The TCA-CP of each cloud platform interfaces or communicates with the corresponding VIM to manage e.g., the allocation and release of virtual resources, the association of virtual to physical resources, and the optimization of resources, etc. For example, the TCA system 800 may utilize the hybrid inventory and APIs of vSphere to perform platform-specific VM operations required to enable some of the features in the vSphere-based cloud 820. The hybrid inventory is a distributed inventory management system that enables the TCA manager 805 to gather the infrastructure status and details from various SDDC infrastructures across the different cloud platforms.

Figure 9:
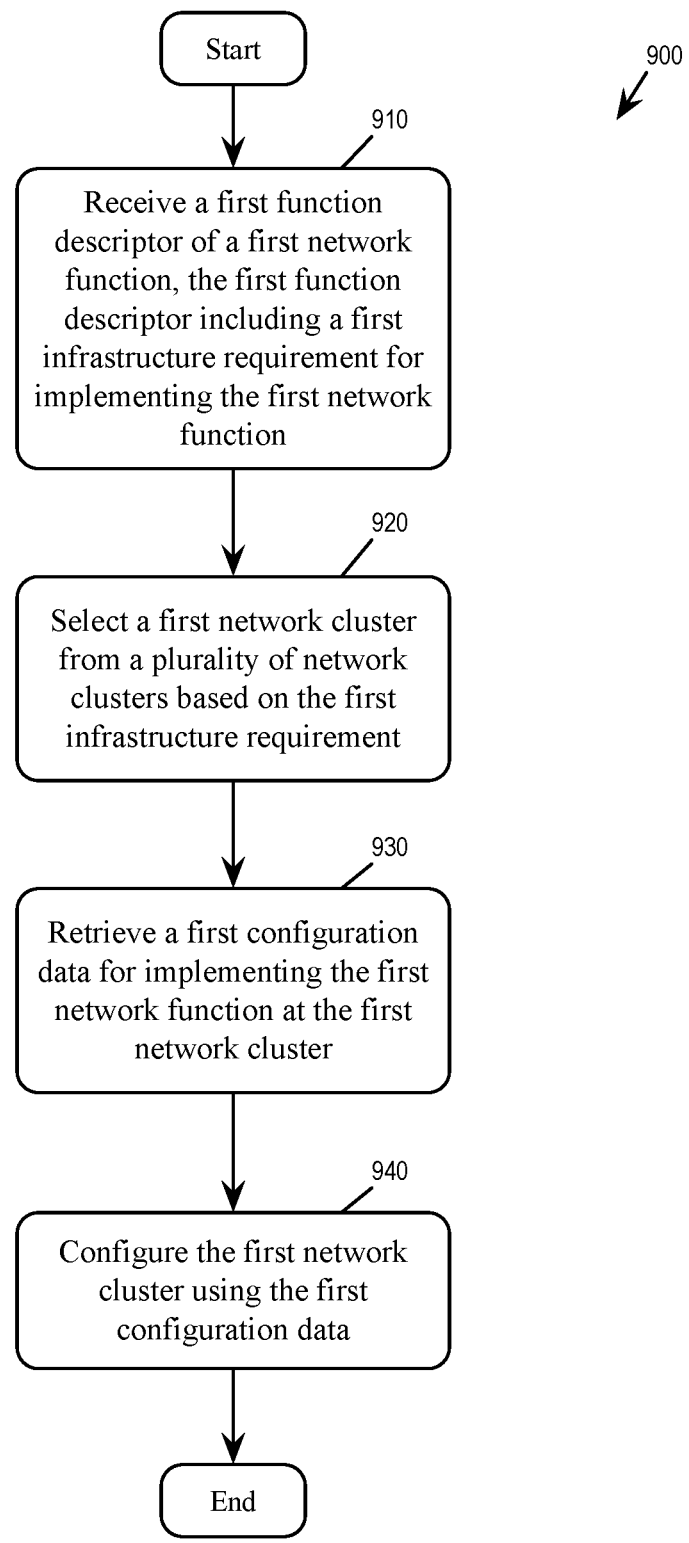
FIG. 9 conceptually illustrates a process for deploying network functions in network clusters based on infrastructure requirements.

For some embodiments, FIG. 9 conceptually illustrates a process 900 for deploying network functions in network clusters based on infrastructure requirements. In some embodiments, one or more processing units (e.g., processor) of a computing device implementing a Telco Cloud Automation (TCA) system (TCA manager and TCA control plane) performs the process 900 by executing instructions stored in a computer readable medium.

In some embodiments, the process 900 starts when the TCA receives (at 910) a first function descriptor of a first network function, the first function descriptor including a first infrastructure requirement for implementing the first network function, which can be a CNF or a VNF. The first infrastructure requirement for implementing the first network function and the function descriptor of the first network function are received in one cloud service archive (CSAR). The TCA may also receive a network function package at a network function catalog for the first network function. In some embodiments, the descriptor is in modified TOSCA in which a syntax of the descriptor specifies a prerequisite for cloud platform that provides an infrastructure for the plurality of network clusters or a requirement for a worker node in a Kubernetes cluster implementing the first network function.

The process selects (at 920) a first network cluster from a plurality of network clusters (e.g., Kubernetes clusters or sets of machines) based on the first infrastructure requirement. In some embodiments, the TCA system uses a distributed inventory that stores information regarding hardware resources across multiple different cloud platforms to discover hardware resources available to serve as the plurality of network clusters. In some embodiments, each cluster in the plurality of network clusters is associated with a cluster template that reports dimension and capability of the resources of the cluster, such that the TCA selects the first network cluster by identifying a network cluster having a cluster template that indicates availability of resources that matches the first infrastructure requirement. In some embodiments, each cluster in the plurality of clusters is tagged or classified according to an intended usage that is determined according to a cluster automation policy (CAP). For example, one or more clusters are classified as workload clusters and one or more clusters are classified as management clusters. The TCA may select the first network cluster by identifying a network cluster that is tagged with an intended usage that matches the first infrastructure requirement.

The process retrieves (at 930) a first configuration data for implementing the first network function at the first network cluster. The TCA may detect a difference between a desired configuration of the first network cluster according to the network function catalog and a current configuration present in the first network cluster and presenting the detected difference at a user interface.

The process configures (at 940) the first network cluster using the first configuration data. In some embodiments, the TCA bootstraps a node configuration operator that runs as a daemon in a workload cluster to configure one or more worker nodes according to the first configuration data. The TCA also bootstraps a virtual machine configuration operator that runs in a management cluster for configuring virtual machines and virtualization software (or hypervisors) implementing the one or more worker nodes according to the first configuration data. In some embodiments, the plurality of network clusters is implemented by a plurality of cloud platforms, such that the TCA configures the first network cluster by communicating the first configuration data to a first control plane component deployed in a first cloud platform that hosts the first network cluster. In some embodiments, a control plane component of the TCA uses an API of the first cloud platform to communicate with the first network cluster. The process 900 then ends.

Figure 10:
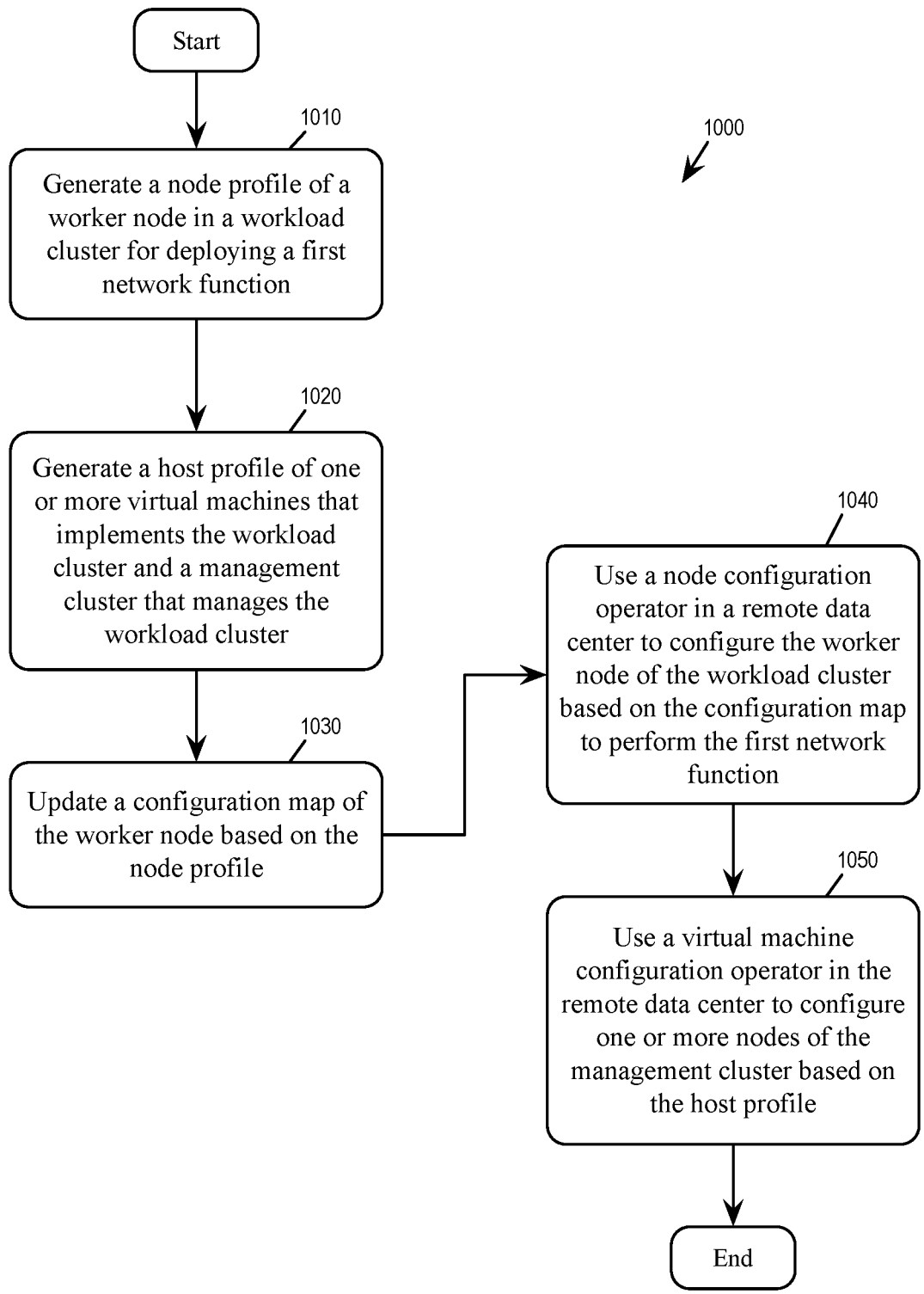
FIG. 10 conceptually illustrates a process for deploying network functions by using custom operators in remote data centers.

For some embodiments, FIG. 10 conceptually illustrates a process 1000 for deploying network functions by using custom operators in remote data centers. The custom operators (NodeConfig and VMConfig operators) are used to configure nodes of network clusters as well as the virtual machines and the host machines that implement the network clusters. In some embodiments, one or more processing units (e.g., processor) of a computing device implementing a Telco Cloud Automation (TCA) system (TCA manager and TCA control plane) performs the process 1000 by executing instructions stored in a computer readable medium.

In some embodiments, the process 1000 starts when the TCA generates (at 1010) a node profile of a worker node in a workload cluster for deploying a first network function. The first network function may be a containerized network function (CNF) or a virtual network function (CNF). The process generates (at 1020) a host profile of a virtual machine that implements the workload cluster and a management cluster that manages the workload cluster. In some embodiments, the host profile includes a custom resource definition that is a configuration set for multiple virtual machines. The process updates (at 1030) a configuration map of the worker node based on the node profile.

The process uses (at 1040) a node configuration (NodeConfig) operator in a remote data center to configure the worker node based on the configuration map to perform the first network function. In some embodiments, the node configuration operator runs as a daemon in the worker node. In some embodiments, the node configuration operator is only used to configure the worker node if the first network function is a CNF but not when the first network function is a VNF.

The process uses (at 1050) a virtual machine configuration (VMConfig) operator in the remote data center to configure one or more nodes of the management cluster based on the host profile. The virtual machine configuration operator also configures one or more virtual machines implementing the workload cluster. In some embodiments, the management cluster and the workload cluster share at least one namespace for the virtual machine configuration operator and the node configuration operator, and the virtual machine configuration operator and the node configuration operator are in a same namespace.

In some embodiments, the virtual machine configuration operator configures virtual machines of the workload cluster to meet a requirement of the first network function. In some embodiments, the virtual machine configuration operator configures virtual machines of the management cluster and the workload cluster according to a customized resource definition provided by the host profile. In some embodiments, the host profile includes a configuration data set for multiple virtual machines, and the virtual machine configuration operator creates configuration data for individual virtual machines based on the host profile. The process 1000 then ends. The TCA may also use the virtual machine configuration operator to configure a virtual machine to implement a second network function that is not a containerized network function (e.g., a VNF) without using the node configuration operator.

In some embodiments, nodes of network clusters, including that of both workload clusters and management clusters, may be implemented by a host machine that is running virtualization software. In some embodiments, the components of the TCA system, and the custom operators may also be implemented by virtual machines implemented by a host machine that is running virtualization software.

Figure 11:
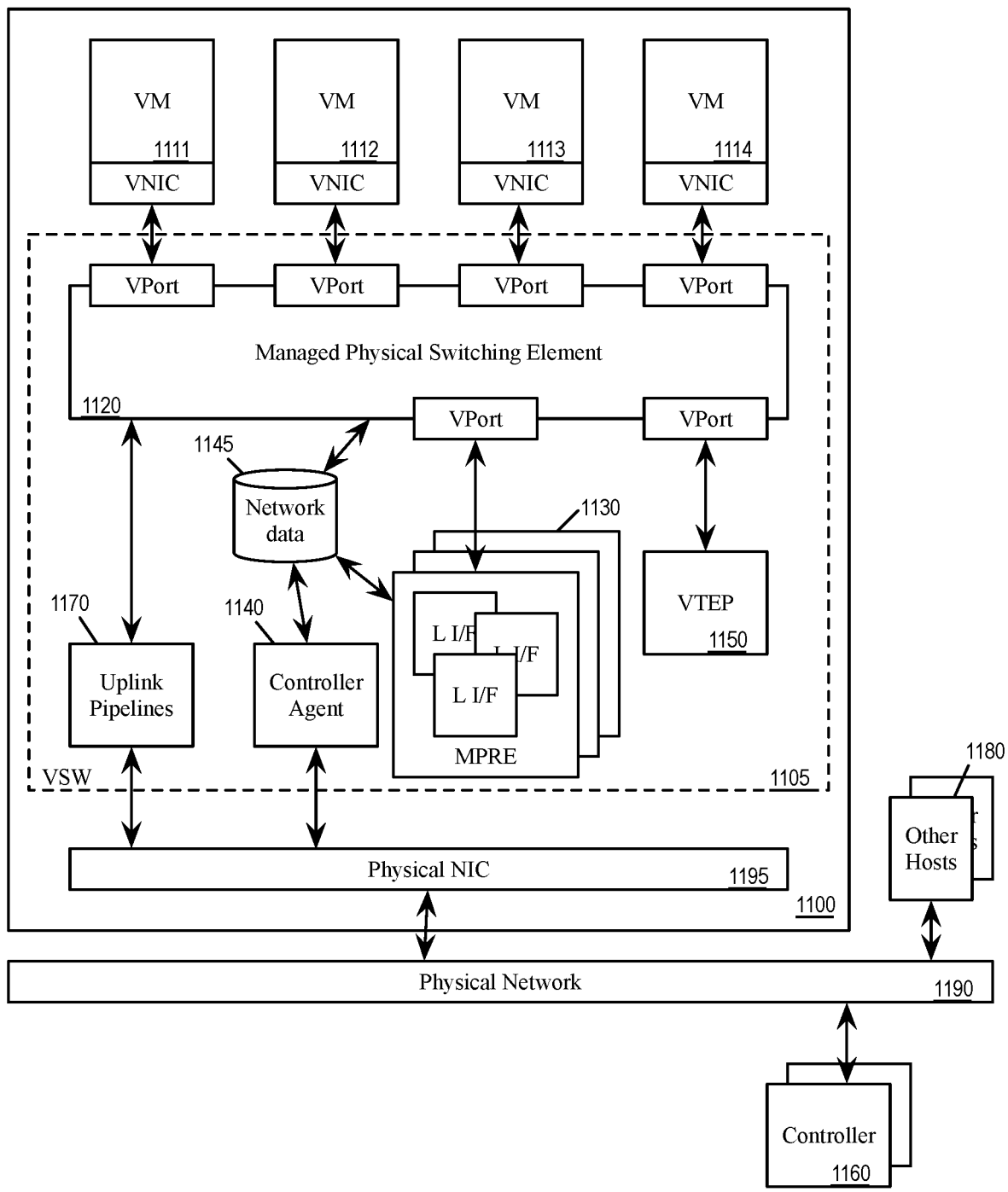
FIG. 11 illustrates a computing device that serves as a host machine that runs virtualization software.

In some embodiments, the virtualization software serves as a virtual network forwarding engine. Such a virtual network forwarding engine is also known as managed forwarding element (MFE), or hypervisors. Virtualization software allows a computing device to host a set of virtual machines (VMs) or data compute nodes (DCNs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 11 illustrates a computing device 1100 that serves as a host machine that runs virtualization software for some embodiments of the invention.

As illustrated, the computing device 1100 has access to a physical network 1190 through a physical NIC (PNIC) 1195. The host machine 1100 also runs the virtualization software 1105 and hosts VMs 1111-1114. The virtualization software 1105 serves as the interface between the hosted VMs 1111-1114 and the physical NIC 1195 (as well as other physical resources, such as processors and memory). Each of the VMs 1111-1114 includes a virtual NIC (VNIC) for accessing the network through the virtualization software 1105. Each VNIC in a VM 1111-1114 is responsible for exchanging packets between the VM 1111-1114 and the virtualization software 1105. In some embodiments, the VNICs are software abstractions of physical NICs implemented by virtual NIC emulators.

The virtualization software 1105 manages the operations of the VMs 1111-1114, and includes several components for managing the access of the VMs 1111-1114 to the physical network 1190 (by implementing the logical networks to which the VMs connect, in some embodiments). As illustrated, the virtualization software 1105 includes several components, including a MPSE 1120, a set of MPREs 1130, a controller agent 1140, a network data storage 1145, a VTEP 1150, and a set of uplink pipelines 1170.

The VTEP (virtual tunnel endpoint) 1150 allows the host machine 1100 to serve as a tunnel endpoint for logical network traffic. An example of the logical network traffic is traffic for Virtual Extensible LAN (VXLAN), which is an overlay network encapsulation protocol. An overlay network created by VXLAN encapsulation is sometimes referred to as a VXLAN network, or simply VXLAN. When a VM 1111-1114 on the host machine 1100 sends a data packet (e.g., an Ethernet frame) to another VM in the same VXLAN network but on a different host (e.g., other machines 1180), the VTEP 1150 will encapsulate the data packet using the VXLAN network's VNI and network addresses of the VTEP 1150, before sending the packet to the physical network 1190. The packet is tunneled through the physical network 1190 (i.e., the encapsulation renders the underlying packet transparent to the intervening network elements) to the destination host. The VTEP at the destination host decapsulates the packet and forwards only the original inner data packet to the destination VM. In some embodiments, the VTEP module 1150 serves only as a controller interface for VXLAN encapsulation, while the encapsulation and decapsulation of VXLAN packets is accomplished at the uplink module 1170.

The controller agent 1140 receives control plane messages from a controller 1160 (e.g., a CCP node) or a cluster of controllers. In some embodiments, these control plane messages include configuration data for configuring the various components of the virtualization software 1105 (such as the MPSE 1120 and the MPREs 1130) and/or the virtual machines 1111-1114. In some embodiments, the configuration data includes those for configuring a worker node to provide a CNF or VNF, or for configuring a node in a management cluster to manage a workload cluster.

In the example illustrated in FIG. 11, the controller agent 1140 receives control plane messages from the controller cluster 1160 from the physical network 1190 and in turn provides the received configuration data to the MPREs 1130 through a control channel without going through the MPSE 1120. However, in some embodiments, the controller agent 1140 receives control plane messages from a direct data conduit (not illustrated) independent of the physical network 1190. In some other embodiments, the controller agent 1140 receives control plane messages from the MPSE 1120 and forwards configuration data to the router 1130 through the MPSE 1120.

The network data storage 1145 in some embodiments stores some of the data that are used and produced by the logical forwarding elements of the host machine 1100 (logical forwarding elements such as the MPSE 1120 and the MPRE 1130). Such stored data in some embodiments include forwarding tables and routing tables, connection mappings, as well as packet traffic statistics. These stored data are accessible by the controller agent 1140 in some embodiments and delivered to another computing device.

The MPSE 1120 delivers network data to and from the physical NIC 1195, which interfaces the physical network 1190. The MPSE 1120 also includes a number of virtual ports (vPorts) that communicatively interconnect the physical NIC 1195 with the VMs 1111-1114, the MPREs 1130, and the controller agent 1140. Each virtual port is associated with a unique L2 MAC address, in some embodiments. The MPSE 1120 performs L2 link layer packet forwarding between any two network elements that are connected to its virtual ports. The MPSE 1120 also performs L2 link layer packet forwarding between any network element connected to any one of its virtual ports and a reachable L2 network element on the physical network 1190 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1130 perform L3 routing on data packets received from a virtual port on the MPSE 1120. In some embodiments, this routing operation entails resolving a L3 IP address to a next-hop L2 MAC address and a next-hop VNI (i.e., the VNI of the next-hop's L2 segment). Each routed data packet is then sent back to the MPSE 1120 to be forwarded to its destination according to the resolved L2 MAC address. This destination can be another VM connected to a virtual port on the MPSE 1120, or a reachable L2 network element on the physical network 1190 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching elements in order to distinguish from "logical" routing/switching elements, even though MPREs and MPSEs are implemented in software in some embodiments. In some embodiments, a MPRE is referred to as a "software router" and a MPSE is referred to as a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or a local MPSE running in each host machine.

In some embodiments, the MPRE 1130 includes one or more logical interfaces (LIFs) that each serve as an interface to a particular segment (L2 segment or VXLAN) of the network. In some embodiments, each LIF is addressable by its own IP address and serves as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order to indicate in which host machine the MPRE operates.

The uplink module 1170 relays data between the MPSE 1120 and the physical NIC 1195. The uplink module 1170 includes an egress chain and an ingress chain that each perform a number of operations. Some of these operations are pre-processing and/or post-processing operations for the MPRE 1130.

As illustrated by FIG. 11, the virtualization software 1105 has multiple MPREs 1130 for multiple, different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE, and hence a same L2 MAC address (vMAC or pMAC). In some other embodiments, each different MPRE belonging to a different tenant has its own port to the MPSE.

The MPSE 1120 and the MPRE 1130 make it possible for data packets to be forwarded amongst VMs 1111-1114 without being sent through the external physical network 1190 (so long as the VMs connect to the same logical network, as different tenants' VMs will be isolated from each other). Specifically, the MPSE 1120 performs the functions of the local logical switches by using the VNIs of the various L2 segments (i.e., their corresponding L2 logical switches) of the various logical networks. Likewise, the MPREs 1130 perform the function of the logical routers by using the VNIs of those various L2 segments. Since each L2 segment/L2 switch has its own a unique VNI, the host machine 1100 (and its virtualization software 1105) is able to direct packets of different logical networks to their correct destinations and effectively segregate traffic of different logical networks from each other.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
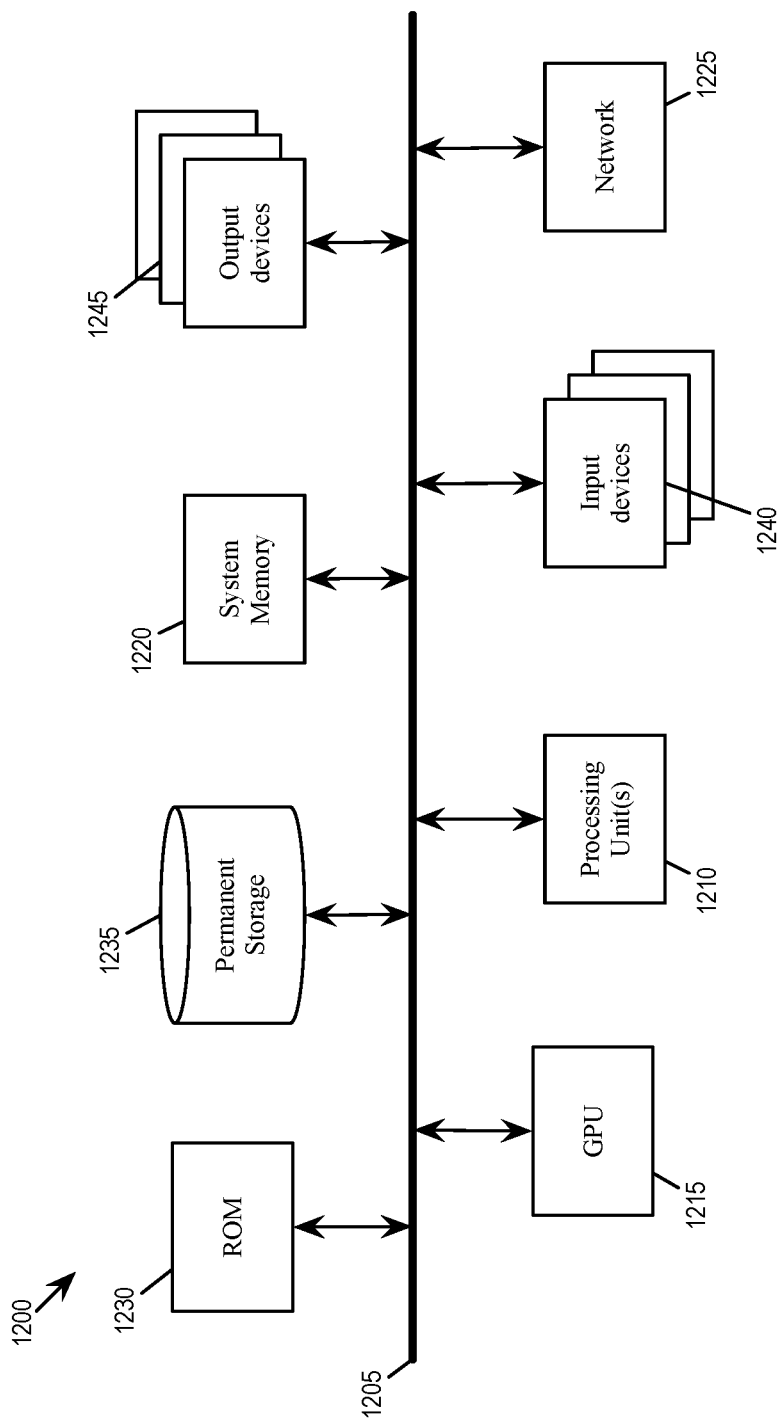
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, and managers. As such, it can be used to execute any of the above-described processes. This computer system 1200 includes various types of non-transitory machine-readable media and interfaces for various other types of machine-readable media. Computer system 1200 includes a bus 1205, processing unit(s) 1210, a system memory 1220, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1220, and the permanent storage device 1235.

From these various memory units, the processing unit(s) 1210 retrieve instructions to execute and data to process in order to execute the processes of the invention. The processing unit(s) 1210 may be a single processor or a multi-core processor in different embodiments. The read-only-memory (ROM) 1230 stores static data and instructions that are needed by the processing unit(s) 1210 and other modules of the computer system 1200. The permanent storage device 1235, on the other hand, is a read-and-write memory device. This device 1235 is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device 1235. Like the permanent storage device 1235, the system memory 1220 is a read-and-write memory device. However, unlike storage device 1235, the system memory 1220 is a volatile read-and-write memory, such as random access memory. The system memory 1220 stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system 1200. The input devices 1240 include alphanumeric keyboards and pointing devices (also called "cursor control devices"). The output devices 1245 display images generated by the computer system 1200. The output devices 1245 include printers and display devices, such as cathode ray tubes (CRT) or liquid crystal displays (LCD). Some embodiments include devices such as a touchscreen that function as both input and output devices 1240 and 1245.

Finally, as shown in FIG. 12, bus 1205 also couples computer system 1200 to a network 1225 through a network adapter (not shown). In this manner, the computer 1200 can be a part of a network of computers (such as a local area network ("LAN"), a wide area network ("WAN"), or an Intranet), or a network of networks, such as the Internet. Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
   generating (i) a node profile of a worker node in a workload cluster for deploying a first network function and (ii) a host profile of a virtual machine that implements the workload cluster and a management cluster that manages the workload cluster;
   updating a configuration map of the worker node based on the node profile;
   using a node configuration operator in a remote data center to configure the worker node based on the configuration map; and
   using a virtual machine configuration operator in the remote data center to configure one or more nodes of the management cluster based on the host profile;
   wherein the workload cluster is selected from a plurality of workload clusters based on a mapping between Cluster Automation Policies (CAPs) and cluster templates, each CAP being associated with a type of intended usage and each cluster template defining configuration and available resources associated with a cluster, the configuration matching an infrastructure requirement including processing capacity and memory capacity.

2. The method of claim 1, wherein the virtual machine configuration operator configures one or more virtual machines implementing the workload cluster.

3. The method of claim 1, wherein the virtual machine configuration operator on figures virtual machines of the workload cluster to meet a requirement of the first network function.

4. The method of claim 1, wherein the virtual machine configuration operator configures virtual machines of the management cluster and the workload cluster according to a customized resource definition provided by the host profile.

5. The method of claim 1, wherein the virtual machine configuration operator discovers hardware capabilities of host machines of virtual machines.

6. The method of claim 1, wherein the first network function is a containerized network function.

7. The method of claim 1, wherein the host profile includes a configuration data set for multiple virtual machines, wherein the virtual machine configuration operator creates configuration data for individual virtual machines based on the host profile.

8. The method of claim 1 further comprising using the virtual machine configuration operator to configure a virtual machine to implement a second network function that is not a containerized network function without using the node configuration operator.

9. The method of claim 1, wherein the management cluster and the workload cluster share at least one namespace for the virtual machine configuration operator and the node configuration operator.

10. The method of claim 1, wherein the virtual machine configuration operator and the node configuration operator are in a same namespace.

11. The method of claim 1, wherein the host profile comprises a custom resource definition that is a configuration set for multiple virtual machines, wherein the virtual machine operator uses the configuration set to create corresponding configuration data for the multiple virtual machines that are encompassed by the configuration set.

12. The method of claim 1, wherein the workload cluster is a Kubernetes cluster that includes a master node and a plurality of worker nodes, wherein the master node controls and manages the worker nodes of the cluster and act as the frontend of the cluster and a workload of the cluster is distributed among the worker nodes.

13. The method of claim 1, wherein the node configuration operator runs as a daemon in the worker node.

14. A non-transitory machine-readable medium storing a program for execution by at least one processing unit, the program comprising sets of instructions for:
   generating (i) a node profile of a worker node in a workload cluster for deploying a first network function and (ii) a host profile of a virtual machine that implements the workload cluster and a management cluster that manages the workload cluster;
   updating a configuration map of the worker node based on the node profile;
   using a node configuration operator in a remote data center to configure the worker node based on the configuration map; and
   using a virtual machine configuration operator in the remote data center to configure one or more nodes of the management cluster based on the host profile;
   wherein the workload cluster is selected from a plurality of workload clusters based on a mapping between Cluster Automation Policies (CAPs) and cluster templates, each CAP being associated with a type of intended usage and each cluster template defining configuration and available resources associated with a cluster, the configuration matching an infrastructure requirement including processing capacity and memory capacity.

15. The non-transitory machine-readable medium of claim 14, wherein the virtual machine configuration operator configures one or more virtual machines implementing the workload cluster.

16. The non-transitory machine-readable medium of claim 14, wherein the virtual machine configuration operator configures virtual machines of the workload cluster to meet a requirement of the first network function.

17. The non-transitory machine-readable medium of claim 14, wherein the virtual machine configuration operator configures virtual machines of the management cluster and the workload cluster according to a customized resource definition provided by the host profile.

18. The non-transitory machine-readable medium of claim 14, wherein the virtual machine configuration operator discovers hardware capabilities of host machines of virtual machines.

19. The non-transitory machine-readable medium of claim 14, wherein the host profile includes a configuration data set for multiple virtual machines, wherein the virtual machine configuration operator creates configuration data for individual virtual machines based on the host profile.

20. The non-transitory machine-readable medium of claim 14, wherein the management cluster and the workload cluster share at least one namespace for the virtual machine configuration operator and the node configuration operator.

21. The non-transitory machine-readable medium of claim 14, wherein the host profile comprises a custom resource definition that is a configuration set for multiple virtual machines, wherein the virtual machine operator uses the configuration set to create corresponding configuration data for the multiple virtual machines that are encompassed by the configuration set.

22. The non-transitory machine-readable medium of claim 14, wherein the workload cluster is a Kubernetes cluster that includes a master node and a plurality of worker nodes, wherein the master node controls and manages the worker nodes of the cluster and act as the frontend of the cluster and a workload of the cluster is distributed among the worker nodes.

23. An electronic device comprising:
 a set of processing units; and
 a non-transitory machine-readable medium storing a program for execution by at least one of the processing units, the program comprising sets of instructions for:
 generating (i) a node profile of a worker node in a workload cluster for deploying a first network function and (ii) a host profile of a virtual machine that implements the workload cluster and a management cluster that manages the workload cluster;
 updating a configuration map of the worker node based on the node profile;
  using a node configuration operator in a remote data center to configure the worker node based on the configuration map; and
 using a virtual machine configuration operator in the remote data center to configure one or more nodes of the management cluster based on the host profile;
 wherein the workload cluster is selected from a plurality of workload clusters based on a mapping between Cluster Automation Policies (CAPs) and cluster templates, each CAP being associated with a type of intended usage and each cluster template defining configuration and available resources associated with a cluster, the configuration matching an infrastructure requirement including processing capacity and memory capacity.

* * * * *